United States Patent
Brown

(10) Patent No.: US 12,542,684 B2
(45) Date of Patent: Feb. 3, 2026

(54) SOCIAL MEDIA CONTENT MANAGEMENT SYSTEMS

(71) Applicant: Lips Co., San Diego, CA (US)

(72) Inventor: Andrea Frances Brown, San Diego, CA (US)

(73) Assignee: Lips Co., San Diego, CA (US)

( * ) Notice: Subject to any disclaimer, the term of this patent is extended or adjusted under 35 U.S.C. 154(b) by 622 days.

(21) Appl. No.: 17/330,368

(22) Filed: May 25, 2021

(65) Prior Publication Data
US 2021/0377052 A1 Dec. 2, 2021

Related U.S. Application Data

(60) Provisional application No. 63/029,886, filed on May 26, 2020.

(51) Int. Cl.
| | |
|---|---|
| H04L 9/00 | (2022.01) |
| G06Q 50/00 | (2012.01) |
| H04L 9/32 | (2006.01) |

(52) U.S. Cl.
CPC .......... *H04L 9/3263* (2013.01); *G06Q 50/01* (2013.01); *H04L 9/321* (2013.01); *H04L 2209/603* (2013.01)

(58) Field of Classification Search
CPC . H04L 9/3263; H04L 9/321; H04L 2209/603; G06Q 50/01
See application file for complete search history.

(56) References Cited

U.S. PATENT DOCUMENTS

| | | | | |
|---|---|---|---|---|
| 9,774,825 | B1* | 9/2017 | John | H04L 65/1089 |
| 2003/0014638 | A1* | 1/2003 | Lincoln | G07B 17/00733 |
| | | | | 713/178 |
| 2007/0198840 | A1* | 8/2007 | Lee | H04L 63/12 |
| | | | | 713/176 |
| 2008/0104128 | A1* | 5/2008 | Drayer | G06F 21/6263 |
| 2012/0233458 | A1* | 9/2012 | Sugano | H04L 9/3268 |
| | | | | 713/158 |
| 2013/0024418 | A1* | 1/2013 | Sitrick | G06F 16/00 |
| | | | | 707/608 |

(Continued)

FOREIGN PATENT DOCUMENTS

| | | | | |
|---|---|---|---|---|
| CA | 3118313 A1 * | 5/2020 | | G06Q 10/04 |
| KR | 20140015867 A * | 2/2014 | | |
| KR | 20200037508 A * | 4/2020 | | |

OTHER PUBLICATIONS

Chakravorty and Rong, Ushare: user controlled social media based on blockchain Jan. 2017 (Year: 2017).*

(Continued)

*Primary Examiner* — Kevin Ayala
(74) *Attorney, Agent, or Firm* — FP; Sikander M. Khan

(57) ABSTRACT

Disclosed embodiments provide techniques for computerized moderation, authorship recording, and distribution of social media content. Moderator-supplied tags are associated with content and supplied to a machine learning system as training data. Using blockchain, authorship is authenticated and can be converted from anonymous to non-anonymous. Collaboration among authors on content is supported with authorship lists that can contain a mix of anonymous and non-anonymous authors. Contribution limits are established to determine royalty payments for sale and rent of content.

16 Claims, 22 Drawing Sheets

(56) References Cited

U.S. PATENT DOCUMENTS

| | | | |
|---|---|---|---|
| 2015/0006298 A1* | 1/2015 | Ross | G06Q 30/0277 |
| | | | 705/14.66 |
| 2017/0322923 A1* | 11/2017 | Dixon | G06N 5/04 |
| 2018/0191659 A1* | 7/2018 | Tene | H04L 51/216 |
| 2019/0005049 A1* | 1/2019 | Mittal | G06F 16/3347 |
| 2020/0013050 A1* | 1/2020 | Finlow-Bates | H04L 9/3239 |
| 2020/0084046 A1* | 3/2020 | Bessonov | H04L 9/321 |
| 2020/0092292 A1* | 3/2020 | Patel | G06F 21/10 |
| 2020/0125575 A1* | 4/2020 | Ghoshal | G06F 3/0484 |

OTHER PUBLICATIONS

Creesch, "Creating and moderating a subreddit 101" (Year: 2017).*
Collier, Marsha, "Facebook, Twitter, and Instagram For Seniors For Dummies, 3rd Edition", Social Media Marketing Dec. 2018 (Year: 2018).*

* cited by examiner

| | 1213 | 1214 | 1215 | 1216 | 1217 |
|---|---|---|---|---|---|
| 1212 | | | | | |
| DATE | PUBKEY | ENCRYPTED NONCE | METADATA | REC# | LAST |
| DATE | PUBKEY | ENCRYPTED NONCE | METADATA | REC# | LAST |
| ○ | ○ | ○ | ○ | ○ | ○ |
| ○ | ○ | ○ | ○ | ○ | ○ |
| ○ | ○ | ○ | ○ | ○ | ○ |
| DATE | PUBKEY | ENCRYPTED NONCE | METADATA | REC# | LAST |
| DATE | PUBKEY | ENCRYPTED NONCE | METADATA | REC# | LAST |
| DATE | PUBKEY | ENCRYPTED NONCE | METADATA | REC# | LAST |

SOCIAL MEDIA CONTENT MANAGEMENT SYSTEMS

PRIORITY CLAIM

The present patent document is a non-provisional patent application claiming the benefit of the filing date of provisional patent application Ser. No. 63/029,886 filed May 26, 2020, the entire contents of which is incorporated herein by reference.

FIELD

The present invention relates generally to computer systems, and more particularly, to social media systems.

BACKGROUND

Social media includes websites and applications that enable people to share content quickly, efficiently, and in real-time. Various social media systems such as Instagram®, Snapchat®, and YouTube®, to name a few, allow users to post and share content with millions of other users. Social media can also include discussion forums such as Reddit®, Quora®, and Digg®. Content curation networks such as Pinterest® and Flipboard® allow users to share and discuss trending content. Social media can also include consumer review networks such as Yelp® and TripAdvisor®. These networks give people a place to review brands, businesses, products, services, travel spots, and many other things. Social media can also include blogging and publishing networks such as WordPress and Tumblr. Blogging and publishing networks give people and corporations tools to publish content online in formats that encourage discovery, sharing, and commenting. Thus, there are many types of social media sites, and new social media sites and applications are continuously being developed. The ability to share photos, opinions, and events in real-time has transformed the way people communicate and conduct business.

Globally, there are more than 3 billion social media users. Social media is an ever-changing and ever-evolving web-based platform. For individuals, social media is used to keep in touch with friends and extended family. Some people will use various social media applications to network and explore career opportunities, find people across the globe with similar interests, and share their thoughts, feelings, insights, and emotions. As social media continues to be a dominant aspect of everyday life, it is desirable to have improvements in social media systems.

SUMMARY

In some embodiments, there is provided a computer-implemented method for content distribution including: processing an anonymous to non-anonymous authorship change of previously-posted social media content, by: receiving a content authorship identification request; performing a key pair authentication check; and updating a content record on a blockchain in response to a successful key pair authentication check.

In some embodiments, there is provided an electronic computation device including: a processor; a memory coupled to the processor, the memory containing instructions, that when executed by the processor, cause the electronic computation device to: process an anonymous to non-anonymous authorship change of previously-posted social media content, by: receiving a content authorship identification request; performing a key pair authentication check; and updating a content record on a blockchain in response to a successful key pair authentication check.

In some embodiments, there is provided a computer program product for an electronic computation device comprising a computer readable storage medium having program instructions embodied therewith, the program instructions executable by a processor to cause the electronic computation device to: process an anonymous to non-anonymous authorship change of previously-posted social media content, by: receiving a content authorship identification request; performing a key pair authentication check; and updating a content record on a blockchain in response to a successful key pair authentication check.

In some embodiments, there is provided a computer-implemented method including: obtaining content for posting; receiving a poster-supplied content tag for the obtained content; associating the poster-supplied content tag with the obtained content; rendering the content for a client device associated with a viewer; receiving a viewer-supplied content tag for the obtained content; associating the viewer-supplied content tag with the obtained content; rendering the content, poster-supplied tag, and viewer-supplied tag for a moderation portal; receiving an update via the moderation portal, wherein the tag update includes removal of the poster-supplied tag, removal of the viewer-supplied tag, or entry of a moderated tag for the obtained content; and saving the tag update.

In some embodiments, there is provided a computer-implemented method including: receiving an authorship list for a content item, wherein the authorship list includes a plurality of authors for the content item; receiving a contribution level for each author of the plurality of authors; receiving payment information for each author of the plurality of authors; and sending funds to each author of the plurality of authors using the payment information in response to determining a royalty earned from the content item.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 13 shows an exemplary authenticity certificate in accordance with some embodiments.

Figure 1:
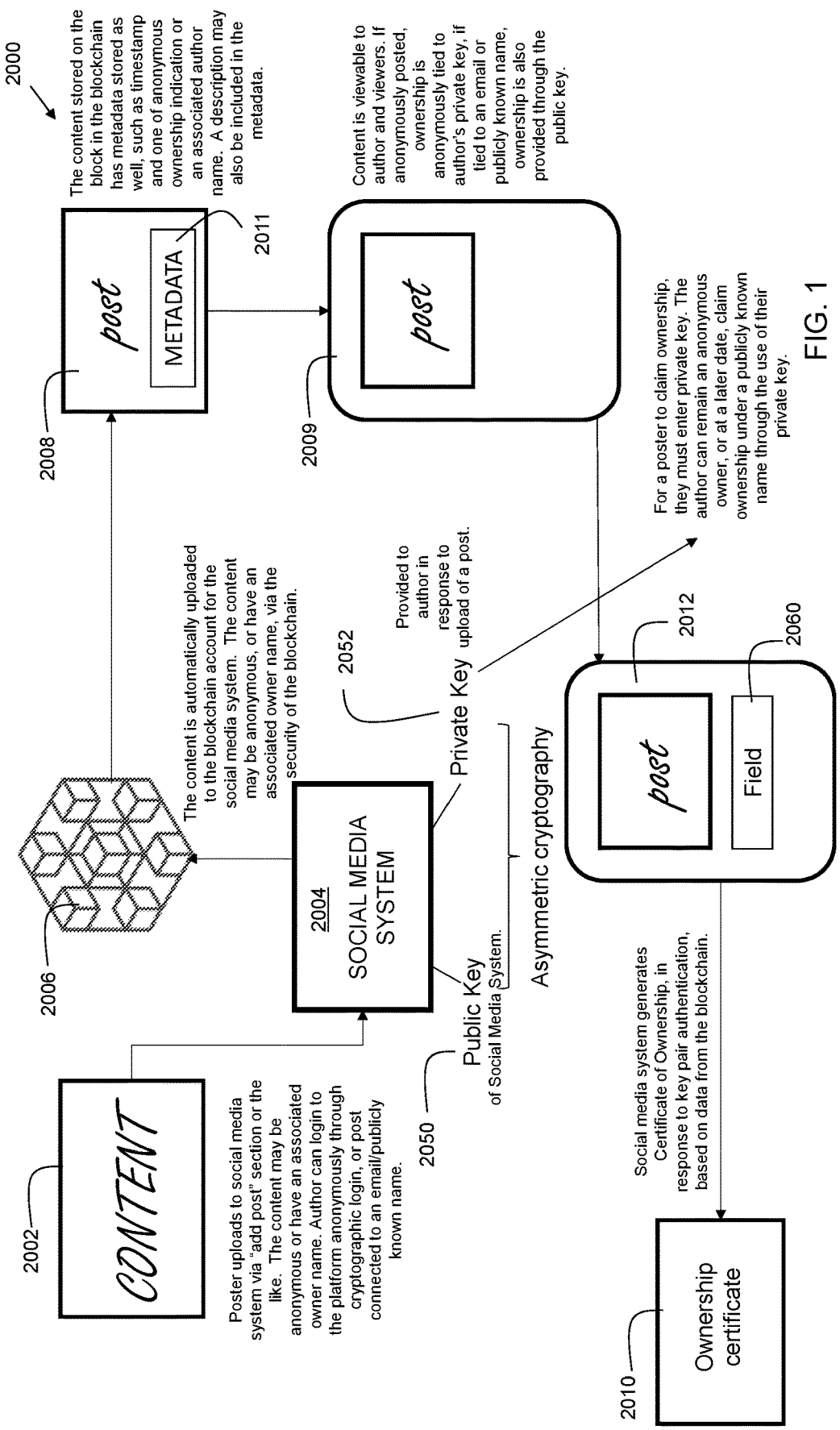
FIG. 1 is a diagram representing an overview for disclosed embodiments regarding immutable proof of anonymous authorship for platform users.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide improvements in the technical field of managing social media systems (or social media websites, used interchangeably herein). One downside to current social media systems is curation of content. Content that some people find objectionable may be considered as art to others. Prior art curation methods and community policing remove content and media from the entire system. In disclosed embodiments, users set up a feed filter. The feed filter is used to customize and improve the content distribution process.

Disclosed embodiments also provide techniques for computerized moderation, authorship recording, and distribution of social media content. Moderator-supplied tags are associated with content and supplied to a machine learning system as training data. In embodiments, anonymous authorship is immutably stored via blockchain technology. Authorship may be authenticated and can be converted from anonymous to non-anonymous on the blockchain, if desired by the author. Collaboration among authors on content is supported with authorship lists that can contain a mix of anonymous and non-anonymous authors. Contribution limits are established to determine royalty payments for sale and rent of content.

Each user gets a personalized content stream presented by the social media system. A content steam (used interchangeably herein as "feed" or "user feed") is a list of content, which may be posted by the user and/or other users to the social media system.

In embodiments, the content in the personalized content stream is based on preset categories of material that users select in settings options, for example, upon creating a user account/profile. Additionally, the users' selections of which preset categories to include and which to exclude functions as a feed filter. The feed filter prevents excluded categories from appearing in the user's personalized content stream. As an example, if a user excludes the preset category of cats, then pictures of cats are blocked from that user's content stream. However, the cat pictures still remain on the social media site and are available for the personalized content streams of other users that have their feed filters configured so that cat pictures are not blocked. In this way, users that do not want to see any cats have cat pictures blocked, whereas others who may not mind, or even like cats, have the option to see the cat pictures. Disclosed embodiments can be utilized with any content type, including images, audio, video, text, interactive content, and/or any other media types now known or hereafter developed. A metadata record is associated with each piece of content. The metadata record can include a tag array, where the content can be classified with one or more categories. In embodiments, a machine learning system performs content classification. For images and videos, the classification can include identification of objects and descriptors for the content. For audio, the classification can include a summarization, genre, and/or other classification information. For text, the classification can include a summarization, topic, and/or other classification information.

Some of the problems facing social media today include hate speech and trolls. Disclosed embodiments may include a user intake process that requires a prospective user to submit sample content prior to being accepted into the social media system. This creates a barrier for trolls and those who practice hate speech, reducing the occurrences of it on the social media platform. In embodiments, a machine learning system analyzes the sample content and classifies it according to previously applied metadata in the form of tags selected by users. If it classifies content as that which potentially violates the norms (or terms) of the social media system (e.g., hate speech), it may then be flagged for human curators (moderators) to determine if the content is eligible to be on the social media system, and if the prospective user is allowed to join the social media system, based on the sample content they provided.

Another feature of disclosed embodiments includes immutable proof of anonymous ownership. Utilizing blockchain, a distributed ledger contains records that cryptographically verify content postings. A "posting" or "post" is an item of content that is uploaded, shared, or otherwise included onto a social media system or website by a user. This allows users to post content anonymously, and at a later time, identify that content, and reclassify it from anonymous content to identified content. There can be a variety of use cases where this feature is quite useful. For example, consider the case of an artist anonymously posting a work of potentially contentious material online. This work is then used in another artist's gallery installation which is popularly received. Seeing that the work was well received, the original artist may want to come forward to claim ownership. With disclosed embodiments, the user can prove that they created the initial post, and now can convert it from anonymous content to identified content.

Another feature of disclosed embodiments is an enhanced machine learning training model for nuanced recognition of complex social concepts. Examples of such concepts can include distinguishing between pornography and erotic art. Disclosed embodiments utilize a unique learning flow to create nuanced data-sets comprising complex visual and textual data. In embodiments, this can include training using moderated tags. As an example, a user may post a piece of content (audio, image, video, text, etc.) to a social media platform and provide classification tags. Other users can then view the content, and have the option to provide their own tags to re-classify the content. Herein, "view" content means to access the content via a client device, which may include viewing an image or video, listening to audio, etc. A viewer (person who is accessing the content, and in this context, is not the poster) may provide their own tag(s) if such viewer feels that the poster (person who posted the content via a client device) did not correctly tag the content. In response to receiving of viewer-provided tags, embodiments send the item of content to a moderator for review. The moderator will then apply his/her/their own tags, and/or use some of the poster's tags and/or viewer-supplied tags to create a moderated tag set. The item of content, along with the moderated tag set is fed to a machine learning system for re-training on the moderated content. In this way, disclosed embodiments can accurately pinpoint and remove harmful content while still allowing the artistic expression that is suppressed with many of today's social media systems.

Another feature of disclosed embodiments includes a collaborative asset compensation feature. With this feature, disclosed embodiments can support sale/rental of assets such as digital images, videos, audio data (music, podcasts, etc.), and text data (e.g., collaborative stories). With this feature, collaborative works are specified through metadata. Collaborators can establish a contribution level. Additionally, each collaborator can establish his/her desired payment method. When the collaborated item is purchased/rented, disclosed embodiments process payments to each collaborator using his/her established payment method.

In this way, embodiments enable non-fungible tokens (NFTs) for art, documents, etc. to be efficiently distributed while providing fair and secure compensation to the content creators. It would 1) allow for anonymous authorship of NFTs, and 2) allow for unique collaborative works to be sold on the blockchain.

Reference throughout this specification to "one embodiment," "an embodiment," "some embodiments", "embodiments," or similar language means that a particular feature, structure, or characteristic described in connection with the embodiment is included in at least one embodiment of the present invention. Thus, appearances of the phrases "in one embodiment," "in an embodiment," "in some embodiments", "in embodiments," and similar language throughout this specification may, but do not necessarily, all refer to the same embodiment.

Moreover, the described features, structures, or characteristics of the invention may be combined ("mixed and matched") in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements. For the purposes of disclosure, the word, "substantially" is defined as "for the most part". It means "to a great extent," but having some room for some minor variation.

FIG. 1 is a diagram representing an overview for some embodiments. At 2002, an item of content may be uploaded/posted to a social media system 2004 via an "add post function," or something similar. In some cases, the art 2002 may be uploaded/posted anonymously. Herein, the terms "upload" and "post" are used interchangeably to mean upload, post, share, or otherwise added to the social media system by a user. In embodiments, every social media post has at least one version, and can have more than one version. Each version of every social media post is stored in blockchain 2006, regardless of whether the content is provided with a name associated or anonymously. The blockchain 2006 provides a property of immutability. Thus, once a version of a social media post is created and stored on the blockchain 2006, that version of the social media post cannot be edited. The content 2002 can include visual art, video, music, games, documents, non-fungible tokens, and/or other content types now known or hereafter developed.

The blockchain 2006 utilizes asymmetric cryptography. A public key, which is publicly known and essential for identification 2050 is stored within the social media system 2004, and as part of the posting process (of the content), the user receives a corresponding private key 2052. It is not possible to derive the public key from the address; likewise, it is impossible to derive the private key from the public key. The keys may each be a series of alphanumeric and/or symbolic string, or words. In some embodiments, a digital wallet, secure database, mobile phone, application, or other suitable mechanism may be used to store and manage private keys.

At 2008, an example block on the blockchain is shown, including additional metadata 2011 such as a timestamp, and, in some cases, a description associated with the social media post. The metadata includes whether the post is anonymous or have an associated author name. Note that "author" and "owner", and "authorship" and "ownership", are used herein interchangeably to mean the creator of an item of content. At 2009, in the example, the social media post is published anonymously. The published post is viewable to users (viewers in addition to the poster), but authorship is not viewable.

After posting or uploading, the author can opt obtain a certificate of ownership (used interchangeably with "authenticity certificate" herein). To do so, the poster can enter the private key 2052 to a field 2060 at 2012. The field is a space for embodiments to receive the private key for a key pair authentication check. When the entered private key matches with the public key, ownership is proven even if the post is anonymous. At 2012, the certificate of ownership is generated by embodiments in response to the match. The certificate of ownership 2012 may be a digital certificate, and provided to the user, such as via e-mail, loading in a digital storage such as a secure database, or other suitable technique. If the match fails, no certificate of ownership is provided. This authorship certificate can remain anonymous and be connected solely to a poster's private key, or if the poster wishes to in the future, they can opt to de-anonymize the post and claim ownership under a publicly known name. In the meantime, the content of the post can be updated on the blockchain without de-anonymizing the post.

With disclosed embodiments, the digital certificates enable anonymous proof of ownership. This provides the valuable feature that, at some future time, an anonymous post can be "claimed" using the private key the user received during the original upload process. This allows for new types of communication and commerce using social media.

An example use case for disclosed embodiments may include a lesbian artist that is living in a traditional community. She posts content such as art, poetry, music, videos, and/or other content that she feels may not be well accepted by her family and community members, and therefore, she posts it anonymously.

At some later time, she relocates, and her new community is more accepting to the content she has generated. She now feels comfortable to take credit for authorship of the content that she previously posted anonymously. At this time, she can present the certificate of ownership as proof that she is the original poster of the content. In some embodiments, the content owner has the option to create a new version of the previous social media posts. The new version of the social media post is added as a new block on the blockchain, as the original post cannot be changed. The new version of the social media post can indicate the owner. Embodiments can support multiple versions of a social media post. In some embodiments, there can be multiple elements of a social media post. For example, a piece of visual artwork can have different elements.

In embodiments, users can collaborate to add different elements to a piece of content anonymously. Each change results in a new version of a social media post that corresponds to a new block on the blockchain. Collaborators can make changes anonymously, and then at some future time, claim their contributions and convert their contributions from anonymous to non-anonymous. The conversion (or "reclassification," used interchangeably herein) from anonymous to non-anonymous is achieved by creating a new version of a social media post, which is stored as a new block in the blockchain. In some embodiments, the social media system may provide a mechanism, such as hyperlinks, for viewing previous versions of the social media post. In this way, users can view the original anonymous post, which cannot be modified due to the immutable properties of the blockchain.

Figure 2:
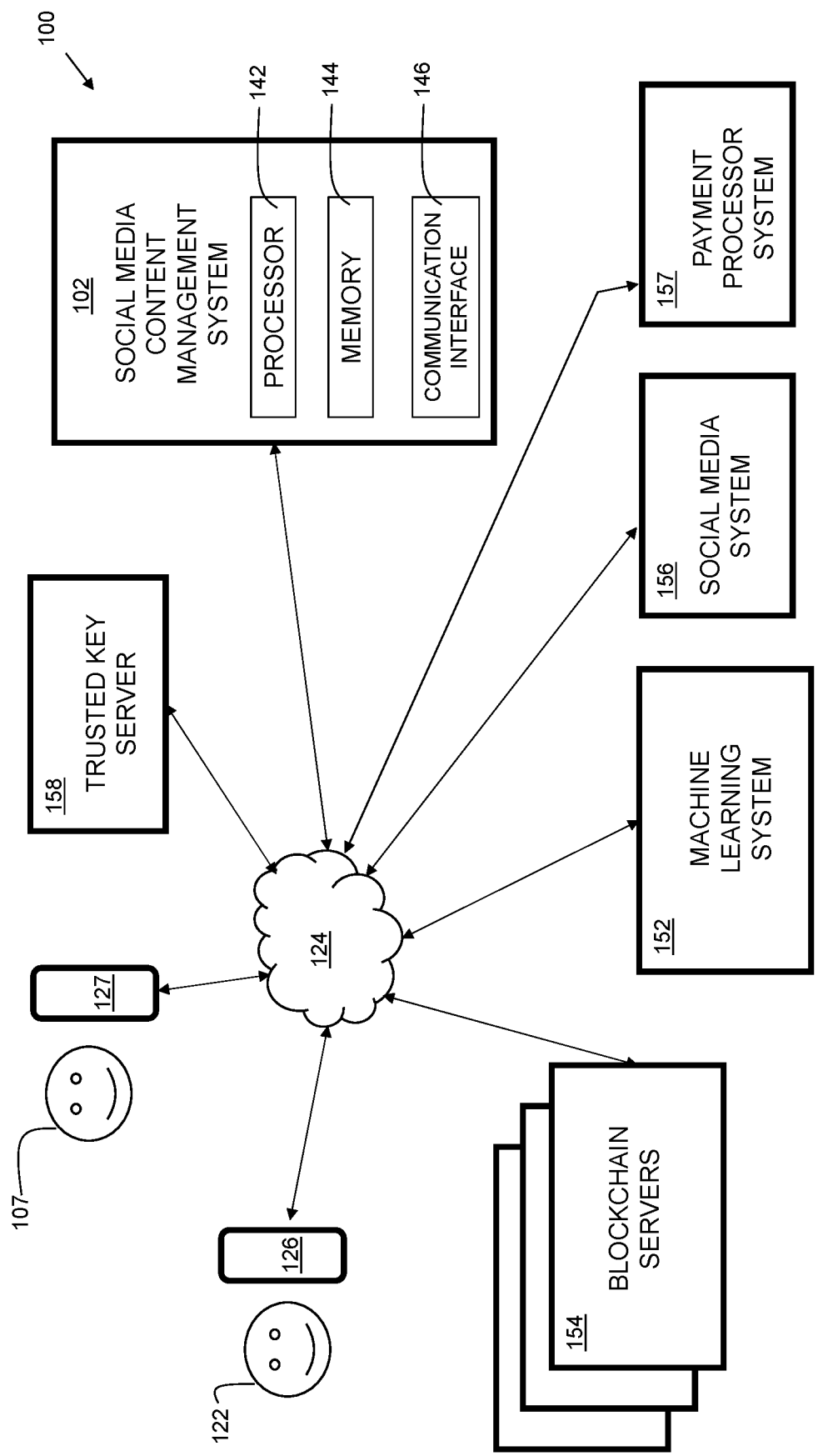
FIG. 2 is an environment for disclosed embodiments.

FIG. 2 is an environment 100 for disclosed embodiments. A social media content management system 102 is a computer-implemented system including a processor 142, a memory 144, and a communication interface 146. System 102 is an electronic computation device. The memory 144 may include non-transitory computer-readable storage including, but not limited to, RAM, ROM, flash, optical storage, magnetic storage, solid state storage, and/or other suitable storage technology. In embodiments, the social media content management system 102 may be implemented in virtual machines (VMs), and/or utilization of containers (e.g., Docker, LXC, etc.). While the social media content management system 102 is implemented as a single computer in FIG. 2, in some embodiments, the social media content management system 102 may be implemented with multiple computers operating together. In some embodiments, system 102 is implemented on a distributed computing system via a plurality of nodes (computing devices). In some embodiments, the social media content management system 102 may be implemented with multiple virtual machines and/or containers operating in a cloud platform or other networked environment such as Kubernetes or other suitable framework.

The social media content management system 102 communicates with network 124. Network 124 can include the Internet, a local area network, and/or wide area network. Also communicating with network 124 is multiple client devices, indicated as 126 and 127. In embodiments, each client device is associated with a user having an account on social media system 156. In FIG. 2, client device 126 is associated with user 122, and client device 127 is associated with user 107. The association between a client device can include, but is not limited to, ownership of the device, possession of the device, and/or a device that the user typically carries with them at most times. In embodiments, the client device may include, but is not limited to, a mobile telephone, a tablet computer, a laptop computer, a desktop computer, a wearable computer, and/or an infotainment system of a vehicle.

Social media system 156 communicates with the social media content management system 102 via network 124. The communication between the social media content management system 102 and the social media system 156 may include utilization of application programming interface (API) calls, and may include the use of HTTP (Hypertext Transfer Protocol), XML (Extensible Markup Language), JSON (JavaScript Object Notation), SOAP (Simple Object Access Protocol), RESTful APIs, and/or other suitable technologies. The social media system 156 may include multiple computer systems, databases, load balancers, and other infrastructure to support a social media system that supports uploading and distribution of content, creation and maintaining of content feeds, a subscription procedure, and/or other social media system features.

Disclosed embodiments may further include a trusted key server 158. The trusted key server 158 may comprise one or more computers that provide sets of asymmetric encryption keys to a user. In embodiments, a first key from the key set serves as a public key, and a second key from the key set serves as a private key. These key sets can be used in blockchain records as part of the anonymous content posting and content authorship reclassification features. The trusted key server may use multiple security measures to ensure secure generation and distribution of keys, including, but not limited to, Transport Layer Security (TLS). The trusted key server 158 may also be used for additional cryptographic functions in disclosed embodiments. In embodiments, performing a key pair authentication check comprises: sending an authenticity certificate and a private key to a trusted key server; and receiving an unlock indication (i.e. notification) from the trusted key server.

Disclosed embodiments may further include a machine learning (ML) system 152. The machine learning system 152 may include one or more computers operating to perform content classification. The machine learning system 152 may include a neural network, convolutional neural network (CNN), Decision Trees, Random Forests, clustering, hierarchical clustering, k-means, and/or any other supervised learning techniques, unsupervised learning techniques, or a combination of both supervised and unsupervised learning techniques.

In embodiments, the machine learning system 152 may perform object identification on objects within images and videos. In embodiments, the machine learning system may perform natural language processing (NLP) on written text and/or spoken language from audio content. The natural language processing may be used to perform entity detection, and/or generate summarizations. Based on the classifications derived by the machine learning system 152, one or more descriptive tags may be generated and/or obtained for each item of content on the social media system 156. The descriptive tags may be stored in a metadata record as a tag array. Thus, in embodiments, for each piece of content in the social media system 156, there is a tag array containing one or more descriptive tags that indicate various attributes of the content. Embodiments, can include generating one or more tags for the social media content; rendering (i.e. communicating for display) content with the selected tags in the content stream of a user; and blocking the social media content from a content stream of a user in response to a match of the applied tags with the feed filter.

Another aspect of disclosed embodiments is multiple distributed blockchain servers 154. The blockchain servers 154 are computer-implemented servers that each contain one or more blockchains that store records of content on the social media system 156. Blockchains have various properties, including decentralization, and immutability. These features impede the ability to forge or falsify information pertaining to the information stored in the blockchain. In some embodiments, one or more users of the social media system 156 may store a copy of the blockchain on an associated electronic computing device (e.g., 126, 127). Adding new blocks utilizes a consensus algorithm. A proof-of-work, proof-of-stake, or other suitable paradigm helps maintain integrity of the blockchain. Disclosed embodiments utilize these blockchain characteristics to enable the features on anonymous content posting and anonymous-to-identified content authorship conversion.

Environment 100 may further include payment processor system 157. In embodiments, payment processing system 157 may include an online payment processor such as PayPal®, Venmo®, or the like. In embodiments, the social media content management system 102 may interface with the payment processor system 157 to disseminate payments to one or more content authors for content made available for sale and/or rent on social media system 156.

In some embodiments, two or more of these systems may be combined as a single system. Processes described as executed by one particular system, may in some cases, be executed by another system, where feasible, within the scope of embodiments of the invention. Elements described as implemented by one particular system, may in some cases, be implemented by another system, where feasible, within the scope of embodiments of the invention.

Figure 3:
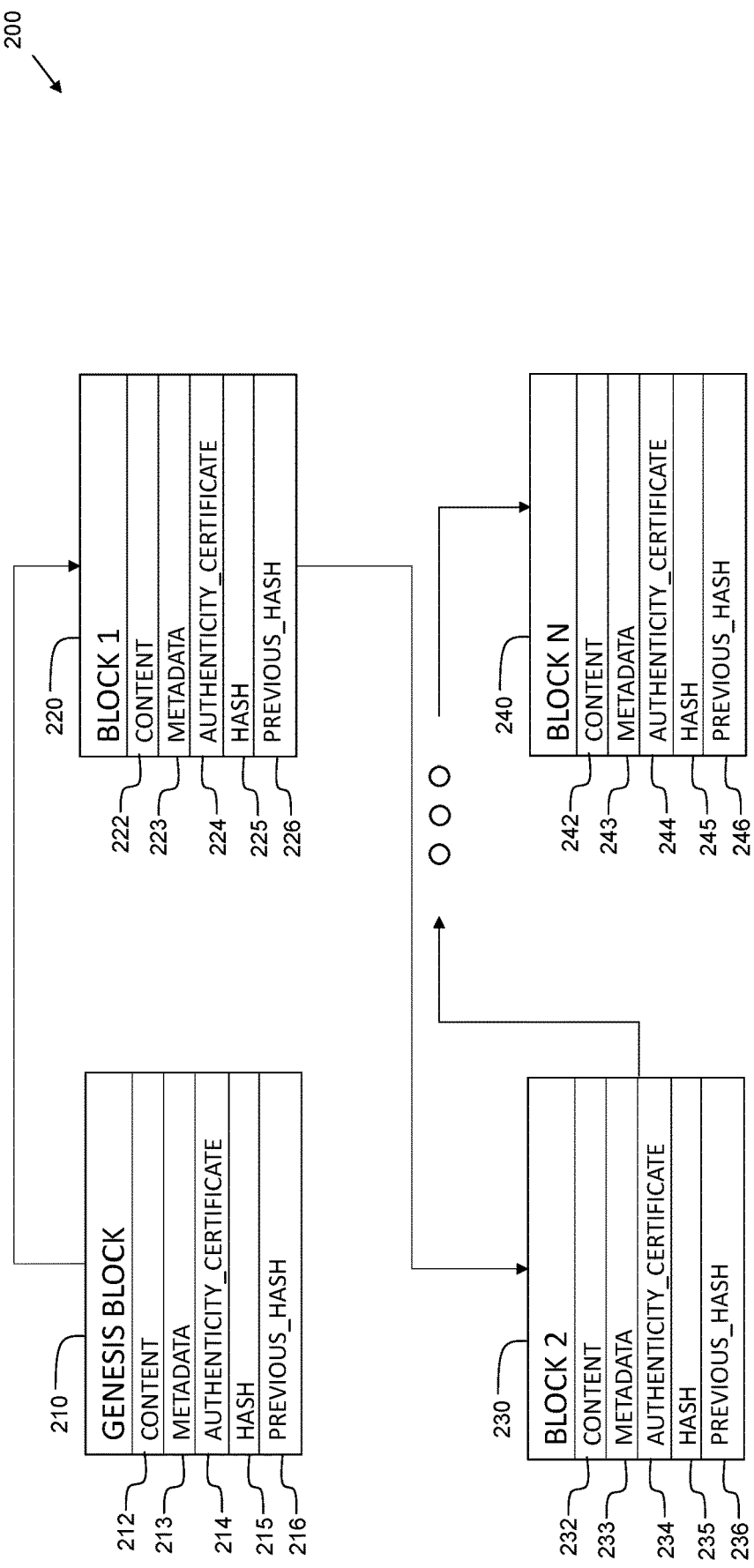
FIG. 3 is an example blockchain in accordance with disclosed embodiments.

FIG. 3 is an example blockchain 200 in accordance with disclosed embodiments. A blockchain such as that shown in FIG. 3 may be stored on multiple computer-implemented blockchain servers (i.e. nodes) 154. Blockchain 200 comprises a first block 210, which is also referred to as a genesis block. Each block may include multiple data sections. In embodiments, block 210 contains a section 212 for content. The content may include a file containing visual art, video, music, games, documents, non-fungible tokens, and/or other content types now known or hereafter developed. In some embodiments, instead of, or in addition to, the actual content data, the section 212 may further include a representative hash, digital signature, or other suitable unique identifier for the content. Block 210 may further include a metadata section 213 which can include various attributes of the content. Block 210 may further include an authenticity certificate 214. The authenticity certificate 214 may include the public key from an asymmetric key pair, as well as additional identifying data encrypted by the public key, such as information contained in the metadata section 213. The data in the authenticity certificate 214 may be used to establish proof of authorship at a later time by a content creator in possession of the corresponding private key. In embodiments, the asymmetric key pair may originate from trusted key server 158. The block 210 further includes a hash 215, which is a digital hash of the previous sections (212-214). In embodiments, the hash may be computed by md5, sha256, or any other suitable algorithm. Block 210 contains a previous hash 216. The previous hash 216 represents the hash of the previous block. For block 210, the genesis block, there is no previous block, and thus, in that special case, the previous hash 216 may be set to zero, or other predetermined value.

Block 220 is the next block in the blockchain 200. It contains a content section 222 similar to the section 212 of block 210. In some circumstances, the content section 222 is identical to the content section 212. In other embodiments, the section 222 may represent a content update, which is a new version of the content stored in section 212 (as the original data relating to the content cannot be changed on the blockchain). Block 220 may further contain a metadata section 223 similar to metadata section 213 of block 210. Block 220 may further contain an authenticity certificate 224. In some circumstances, the authenticity certificate 224 is identical to the authenticity certificate 214. In some circumstances, the authenticity certificate 224 may be updated for a new version of the content. In this case, the authenticity certificate may include a first public key corresponding to a first author that created the original content, and a second public key corresponding to a second author that created the revision. In this way, for collaborative works, or content that builds on previous versions of content, anonymous content can then be converted to identified content at some later time, for each individual contributor. The conversion from anonymous to identified may occur at different times for different authors. Block 220 further includes a hash 225, which is a digital hash of the previous sections (222-224). In embodiments, the hash may be computed by md5, sha256, or other suitable algorithm. Block 220 contains a previous hash 226. For block 220, the previous hash 226 is equal to the hash 215 of block 210.

Block 230 is the next block in the blockchain 200. It contains a content section 232 similar to the content section 212 of block 210. Block 230 may further contain a metadata section 233 similar to metadata section 213 of block 210. Block 230 may further contain an authenticity certificate 234. In some circumstances, the authenticity certificate 234 is identical to the authenticity certificate 224. In some circumstances, the authenticity certificate 234 may be updated for a new version of the content. Block 230 further includes a hash 235, which is a digital hash of the previous sections (232-234). In embodiments, the hash may be computed by md5, sha256, or other suitable algorithm. Block 230 contains a previous hash 236. For block 230, the previous hash 236 is equal to the hash 225 of block 220. Blocks can continue to be added to the blockchain on a periodic basis, and/or whenever changes to content are made.

The most recent block is indicated as block 240 (block N). Block 240 contains a content section 242 similar to the content section 212 of block 210. Block 240 may further contain a metadata section 243 similar to metadata section 213 of block 210. Block 240 may further contain an authenticity certificate 244. Block 240 further includes a hash 245, which is a digital hash of the previous sections (242-244). In embodiments, the hash may be computed by md5, sha256, or other suitable algorithm. Block 240 contains a previous hash 246, which is equal to the hash of the previous block.

Figure 4:
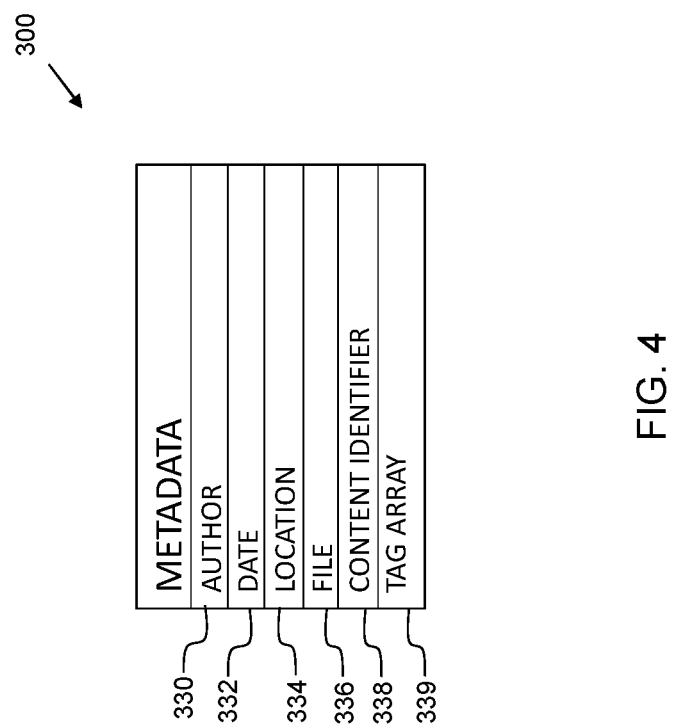
FIG. 4 is an example metadata data structure in accordance with disclosed embodiments.

FIG. 4 is an example metadata data structure 300 in accordance with disclosed embodiments. Metadata data structure 300 includes an author field 330, indicating the name of the author or authors. Metadata data structure 300 further includes a date field 332 indicating the date of creation and/or modification of the content. Metadata data structure 300 may optionally include location information 334. In some embodiments, this information can include geographical information (e.g., latitude and longitude coordinates) retrieved from a geolocation receiver such as a GPS (Global Positioning System) receiver. Metadata data structure 300 further includes a file field 336 indicating the name of the file for the content. Metadata data structure 300 further includes a content identifier field 338, which may include a unique alphanumeric identifier, and/or a hash of the file. In embodiments, the hash may include an md5 hash, a sha256 hash, or other suitable hash. Metadata data structure 300 further includes a tag array 339. The tag array may include one or more descriptor tags indicating attributes about the content. As an example, an image of a surfer out on the ocean may have a tag of "surfing" and a tag of "ocean," as well as other descriptive tags pertaining to the image. Each piece of content on the social media system 156 has an associated metadata structure 300 that is accessed by the social media content management system 102 to provide the features of computer-implemented feed-based content moderation. This enables improvements in the technical field of content distribution by facilitating user generated data-sets to train the machine learning process used in curating personalized content streams.

Figure 5:
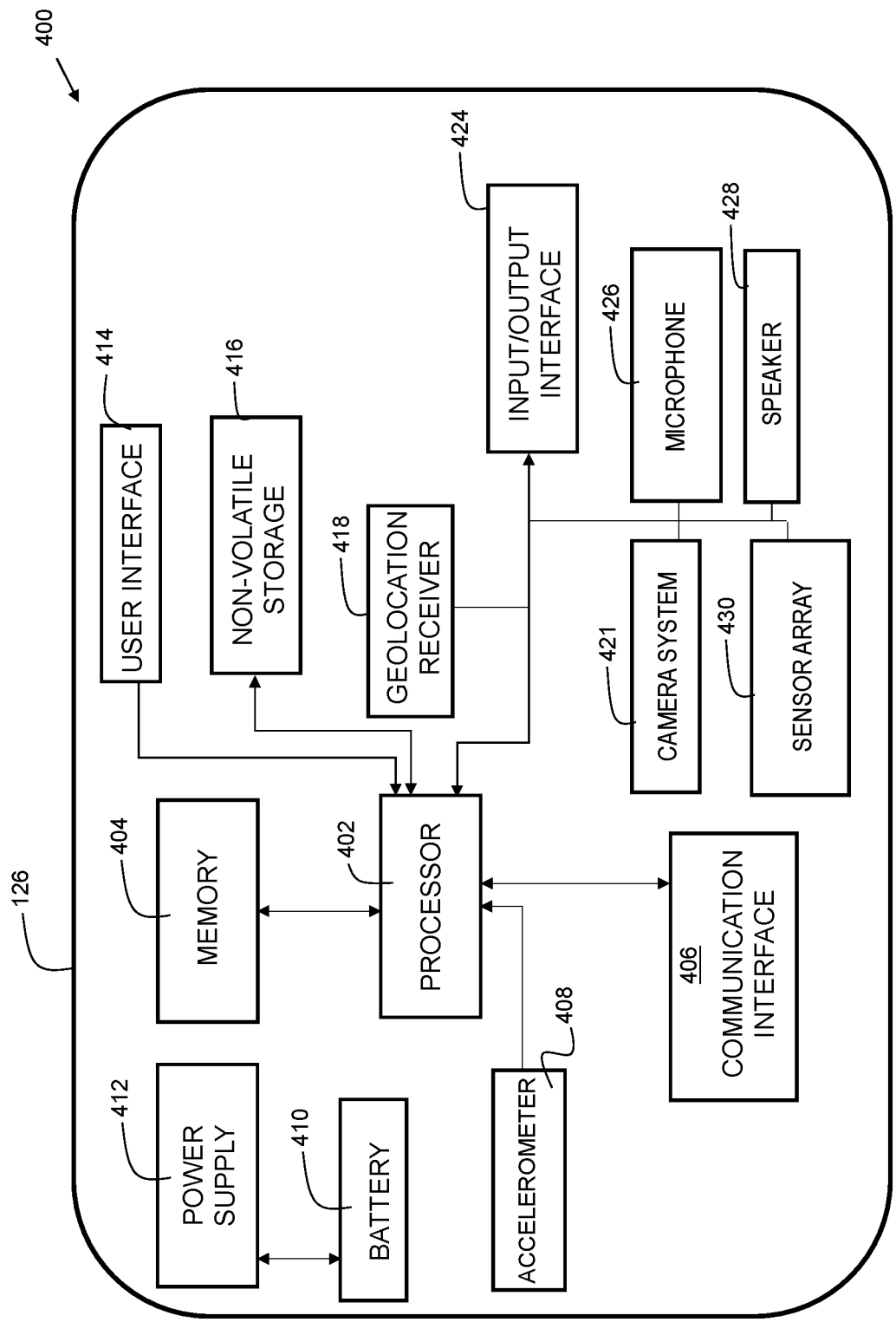
FIG. 5 is a block diagram of a client device used with disclosed embodiments.

FIG. 5 is a block diagram of an example client device 126 from which a user may interact with, or use, disclosed embodiments. FIG. 5 shows a block diagram 400 of an electronic computing device such as shown in FIG. 2 as 126 and 127. Some of the components shown in FIG. 5 may not be present in every embodiment. The example client device 126 includes a processor 402, which is coupled to memory 404. The memory 404 may include non-transitory computer-readable storage including, but not limited to, RAM, ROM, flash, optical storage, magnetic storage, solid state storage, and/or other suitable storage technology. The example client device 126 may further include a communication interface 406. The communication interface 406 may include Wi-Fi, cellular transceivers, Bluetooth, Bluetooth Low Energy (BLE), Zigbee, Thread, and/or other suitable communication technology. The communication interface 406 may be used to communicate with social media system 156.

The example client device 126 further includes a power supply 412. The power supply 412 may be configured to connect to a standard household electrical outlet (120V) for operation and/or charging of battery 410. Battery 410 may include a lithium-ion battery, or other suitable battery type.

The example client device 126 may further include an input/output (I/O) interface 424. The I/O interface 424 may include multiple pins configured as inputs, outputs, or bidirectional pins for interfacing with various peripherals, including, but not limited to, printers, additional sensors, and/or other electronic devices.

The example client device 126 may further include a geolocation receiver 418. The geolocation receiver 418 may include a Global Positioning System (GPS) receiver, and/or other suitable receiver such as compatible with the GLONASS and/or Galileo geolocation systems. The geolocation receiver 418 may be utilized for various features for determining the location where content was created and/or uploaded. As an example, the geolocation receiver 418 may derive latitude and longitude values for the current location during acquisition of images and/or videos that are posted to the social media system.

The example client device 126 may further include non-volatile storage 416. Non-volatile storage 416 may include one or more sections of protected flash memory, or other suitable memory for storing information such as a device serial number, model number, MAC address, and/or other suitable unique identifiers for an electronic device such as 126 and/or 127. These unique identifiers can be used to support various features of social media system 156.

The example client device 126 may further include a user interface 414. The user interface may include a touchscreen, a keyboard, and/or other buttons, switches, lights (LEDs), buzzers, speakers, and/or other peripherals for interfacing with a user. In some implementations, elements of the user interface may be implemented on the computing device 126 via HTML pages accessed by an onboard browser, an application (app) executing on the mobile computing device, and/or other suitable technique.

The example client device 126 may further include an accelerometer 408. The accelerometer 408 may be used to track motion of the electronic computing device 126. In some implementations, the motion detected from the accelerometer 408 may be used to derive health data, such as number of steps taken per day by a user. The health data may be uploaded to the social media system 156 in the form of a health report, news feed, or other content delivery mechanism.

The example client device 126 may further include a camera system 421. Camera system 421 may include multiple cameras, including visible light cameras and/or infrared cameras. The multiple cameras can include a front-facing camera and a rear-facing camera of an electronic computing device such as a smartphone. Images and/or videos acquired by the camera system 421 may be posted to social media system 156 via network 124.

The example client device 126 may further include a sensor array 430. Sensor array 430 may include multiple sensors, including temperature sensors, humidity sensors, vibration sensors, moisture sensors, and/or other sensor types. In embodiments, data from the sensor array 430 may be included in the metadata data structure for a piece of content. As an example, a user can post an image of a person skiing, and also include relevant metadata such as temperature at the time the image was acquired.

The example client device 126 may further include a microphone 426 for acquiring sound. Disclosed embodiments may further include a speaker 428 for generating sound. Additionally, the speaker 428, in combination with microphone 426 and camera system 421 enable two-way communication between two computing devices, such as computing device 126 and 127. In some embodiments, a two-way conversation can be a type of content that is uploaded to the social media system 156.

The aforementioned components of the example client device are not intended to be limiting. Furthermore, for the sake of clarity, not all connections between components on block diagram 400 are shown. It will be understood that a variety of parallel and/or serial communication busses, wiring harnesses, ribbon cables, and/or other suitable connectivity may be included as necessary to properly connect each peripheral with any needed power, data, clock, and/or other logical signal connections.

Figure 6:
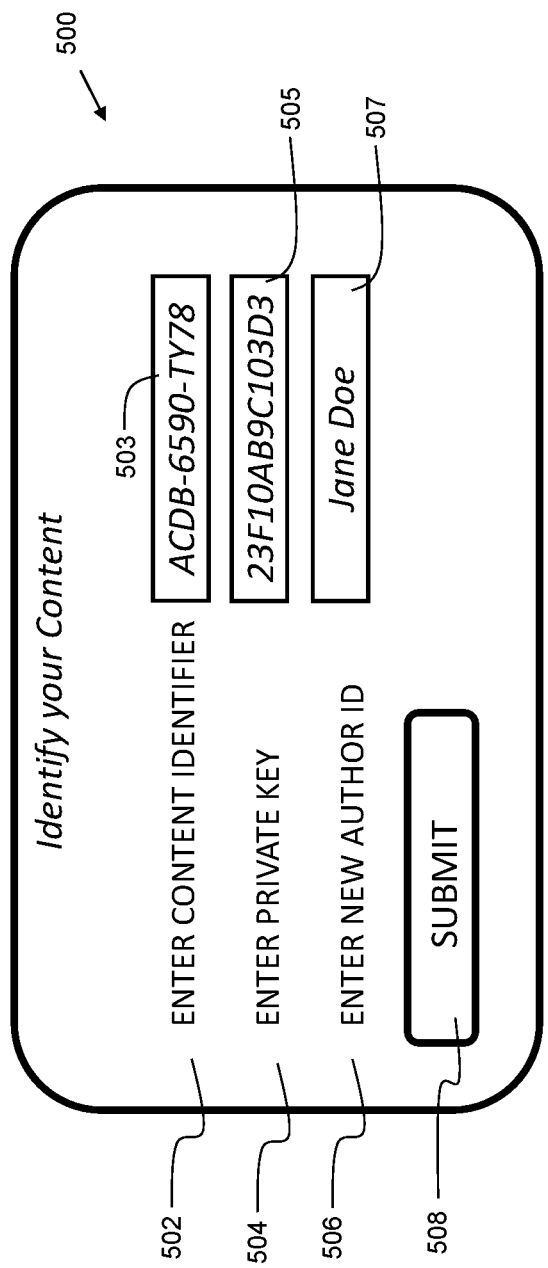
FIG. 6 is an exemplary user interface for converting anonymous content to identified content.

FIG. 6 is an exemplary user interface 500 for converting anonymous content to identified content. User interface 500 includes a content identifier field 502 for entering a content identifier 503. User interface 500 further includes a private key field 504 for entering a private key 505. In embodiments, the content identifier 503 and/or private key 504 may be entered via keyboard, importing a file, or other suitable method. User interface 500 further includes a new author ID field 506 for entering a new author identifier 507. User interface 500 further includes a submit button 508 for submitting the new author identifier 507. When a user invokes the submit button 508, it causes the associated client device (e.g., 126) to send the content identifier 503, private key 505, and author identifier 507 to the social media content management system 102. The social media content management system 102 can then retrieve the corresponding record from the blockchain from one of the blockchain servers 154, and upon confirmation of the supplied private key, update the author-identifier.

Figure 7:
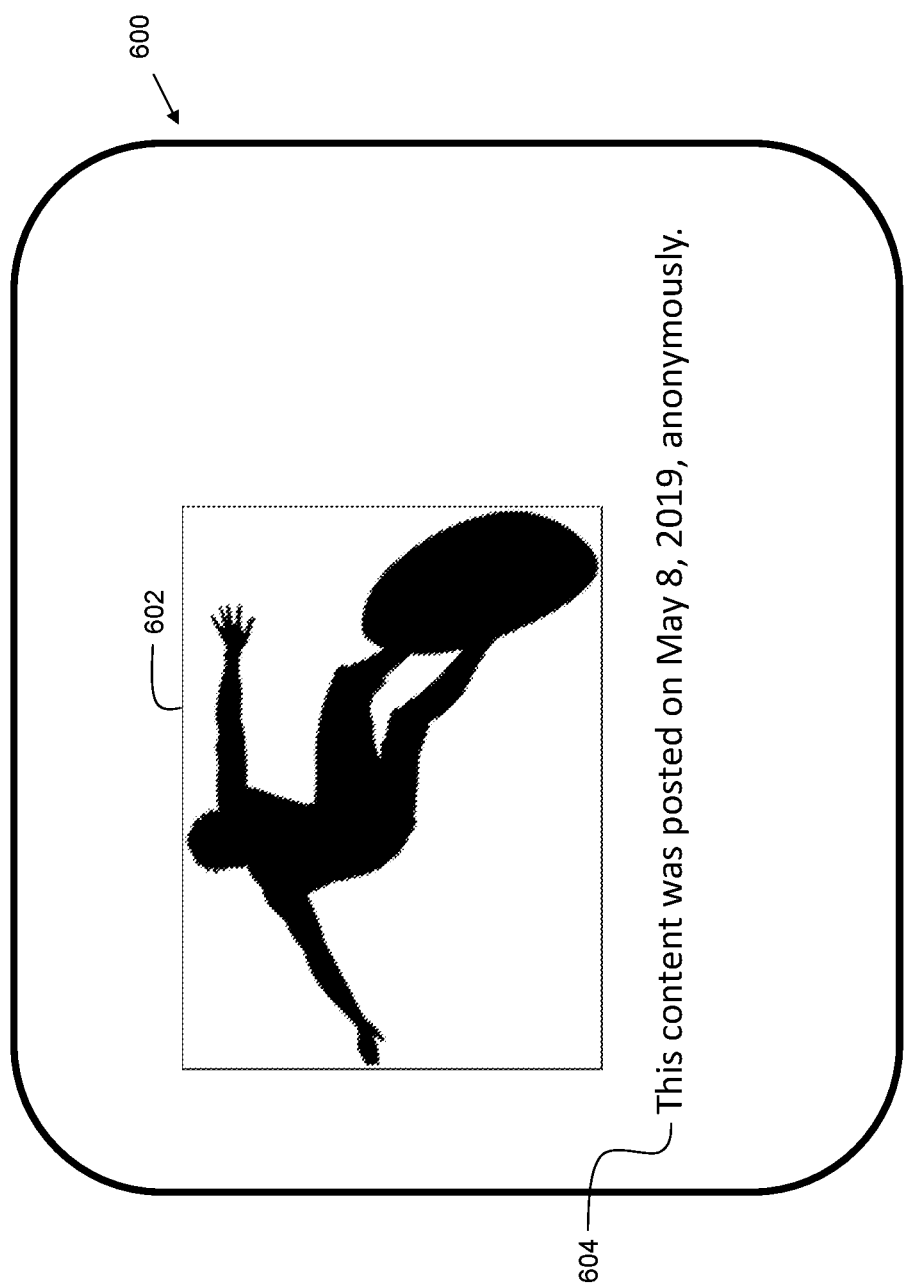
FIG. 7 is an example of anonymously posted content.

FIG. 7 is an example of a first version of a social media post that is posted anonymously. Thus, it is anonymously posted content. An electronic display 600 shows a rendering of an image 602. Image 602 can be a photograph, illustration, document, or other image type. Authorship information is shown below the image at 604. The authorship information indicates the content was posted on May 8, 2019, anonymously.

Figure 8:
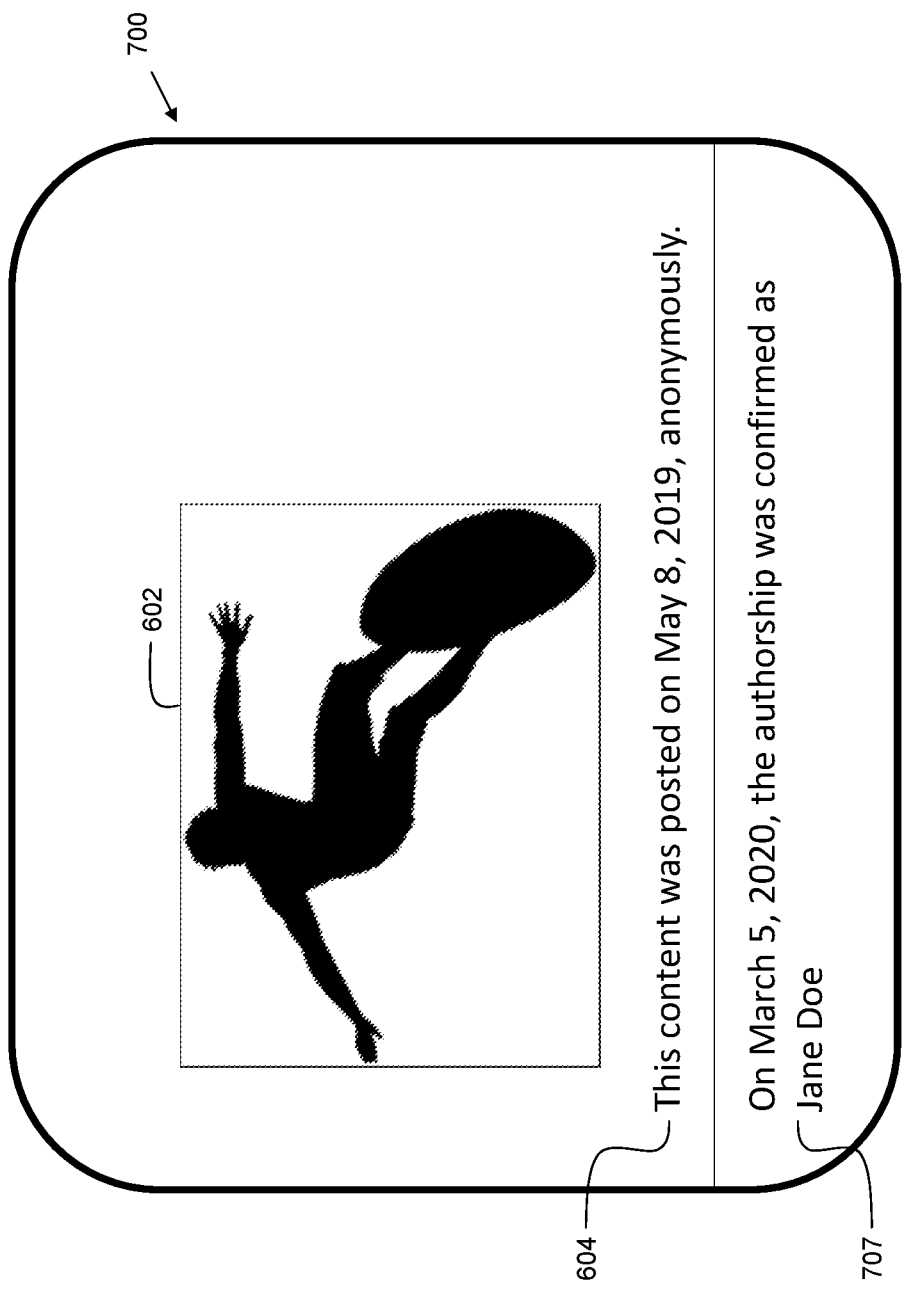
FIG. 8 is an example of anonymously posted content transitioned to identified content.

FIG. 8 is an example of a second version of the social media post of FIG. 7, showing the appearance of the social media post content after transitioning to identified content. The second version of the post shows authorship identification 707. The second version of the post is stored as a new block on the blockchain (e.g., 2006). An electronic display 700 shows a rendering of an image 602. Image 602 can be a photograph, illustration, or other image type. Authorship information is shown below the image at 604. The authorship information indicates the content was posted on May 8, 2019, anonymously. The electronic display further shows new authorship identification at 707, indicating that on Mar. 5, 2020, the authorship was confirmed as Jane Doe (see 507 of FIG. 6).

Figure 9:
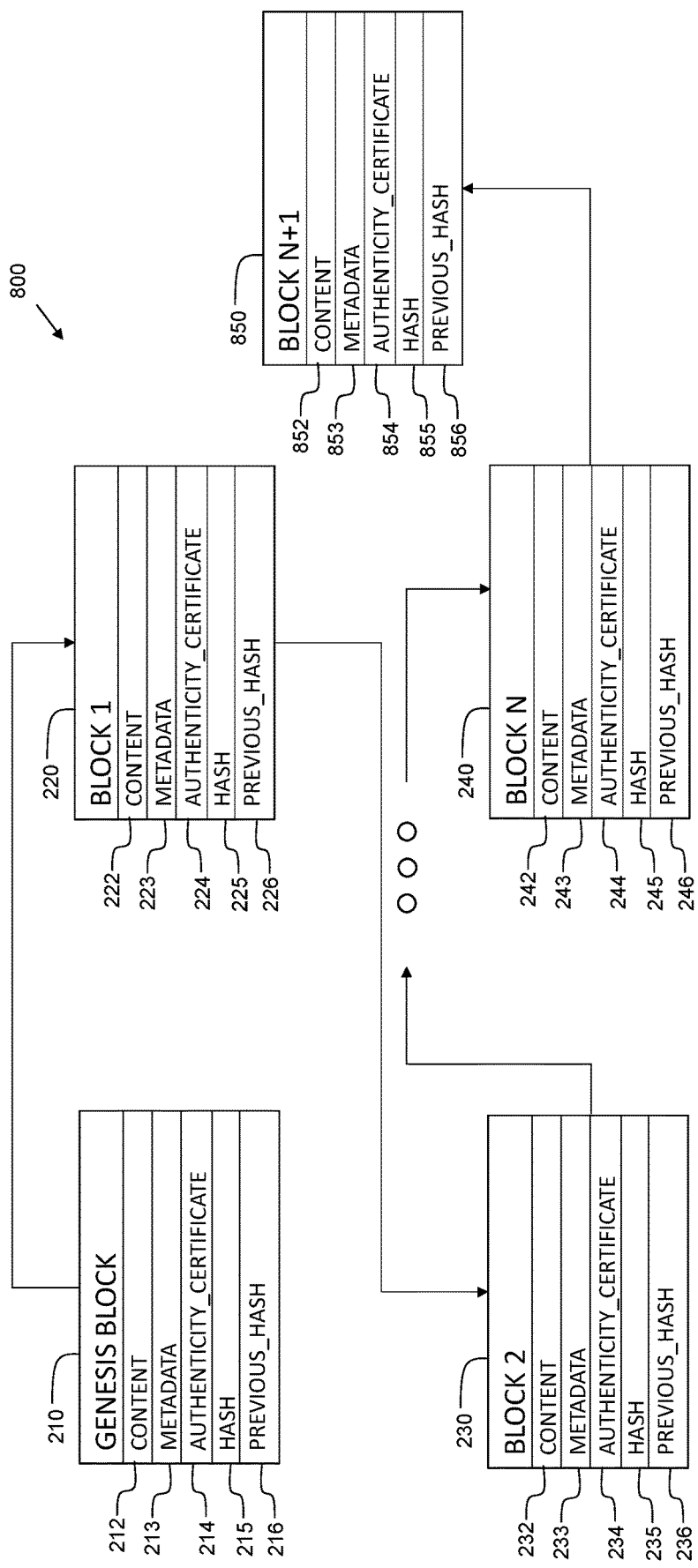
FIG. 9 is another example blockchain in accordance with disclosed embodiments.

FIG. 9 is another example blockchain 800 in accordance with disclosed embodiments. Blockchain 800 is similar to blockchain 200, with the exception of newly added block 850. Block 850 contains a content section 852 similar to the content section 212 of block 210. Block 850 may further contain a metadata section 853 similar to metadata section 213 of block 210. Block 850 may further contain an authenticity certificate 854. Block 850 further includes a hash 855, which is a digital hash of the previous sections (852-854). In embodiments, the hash may be computed by md5, sha256, or other suitable algorithm. Block 850 contains a previous hash 856, which is equal to the hash 245 of the previous block 240. For each new social media post, or version of a social media post, a new block is created on the blockchain. In some embodiments, a new version of a social media post is created by copying text, images, metadata, and/or other associated information to a new data structure, applying additional changes from the poster, and storing the copied information along with the additional changes into a new block on the blockchain.

An exemplary use case as shown in FIGS. 6-8 will be explained in further detail below. Initially, a user posted the image 602 of FIG. 7 anonymously. At the time of the anonymous post, a corresponding blockchain record was created, including an authenticity certificate. The authenticity certificate contains information regarding the content, based on a key pair generated by the trusted key server 158. One of the keys from the key pair is used to encrypt information stored in the authenticity certificate within the blockchain record. The user that posted the content, does so anonymously, and maintains the second key from the key pair in a secure location as a private key.

At some time in the future, the user wishes to assume authorship of the previously posted content that heretofore has been indicated as anonymous. The user enters the information as shown in FIG. 6. Upon invoking the submit button 508, the information, including content identifier 503, private key 505, and author identifier 507, are sent to the social media content management system 102. Upon receiving the content identifier, the social media content management system 102 acquires the blockchain record from the blockchain having the content identifier (e.g., 338 of FIG. 4) that matches the provided content identifier 503. The submitted private key 507 is then used to attempt decryption of a section of the authenticity certificate (e.g., 214 of FIG. 3). If that decryption is successful, resulting in obtaining an expected output of the decryption, then a new block is created on the blockchain (e.g., 850 of FIG. 9), which contains an updated authenticity certificate 854. The metadata 853 is updated to include the new author identifier, and is rendered accordingly as shown in FIG. 8 with updated authorship identification 707. Thus, the previously posted anonymous content is converted to identified content in a manner that exploits the immutable properties of a blockchain.

Figure 10:
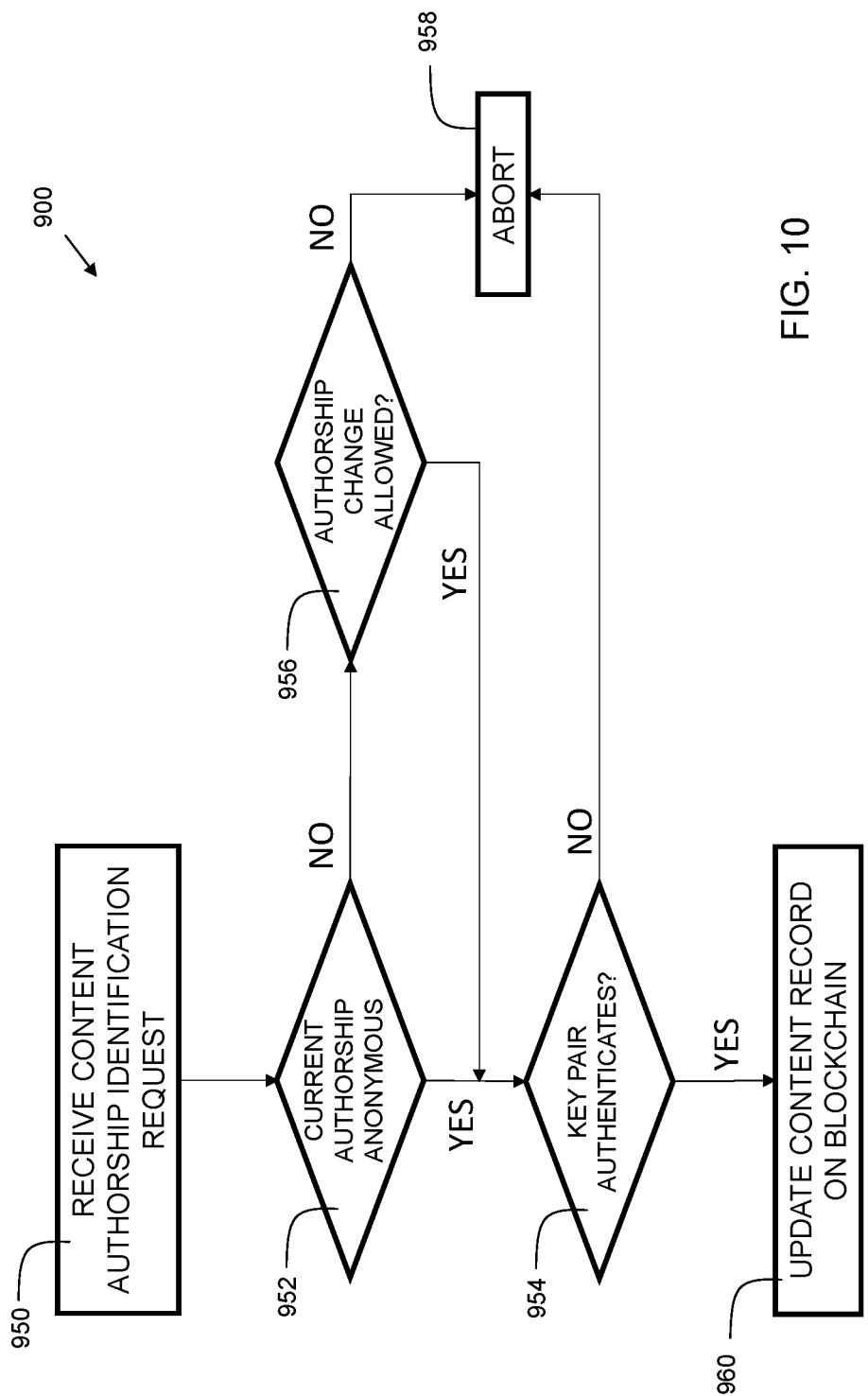
FIG. 10 is a flowchart showing a process for authorship change.

FIG. 10 is a flowchart 900 showing a process for authorship change. At 950, a content authorship identification request is received. In embodiments, this occurs when a user invokes submit button 508 of FIG. 6. At 952, a check is made to determine if the current authorship is anonymous. If yes at 952, then the process continues to 954 to determine if the key pair authenticates, meaning that the first key which is stored in and/or used to create the authenticity certificate, corresponds to the second key which is held by the anonymous poster. If yes at 954, then the content record is updated on the blockchain at 960. This may be performed by adding a new block to the blockchain (e.g., 850 of FIG. 9). If no at 954, then the process aborts at 958 without updating the content record. Embodiments include updating a content record on a blockchain in response to a successful key pair authentication check.

In some embodiments, content may only be transitioned from anonymous authorship to identified authorship. Thus, if no at 952, the process continues to 956 to check if the policy of the social media system 156 allows non-anonymous authorship changes. If no at 956, then the process aborts at 958 without updating the content record. If yes at 956, then the process continues to 954 to determine if the key pair authenticates, meaning that the first key which is stored in and/or used to create the authenticity certificate, corresponds to the second key which is held by the anonymous poster. If yes at 954, then the content record is updated on the blockchain at 960. This may be performed by adding a new block to the blockchain (e.g., 850 of FIG. 9). If no at 954, then the process aborts at 958 without updating the content record.

Figure 11:
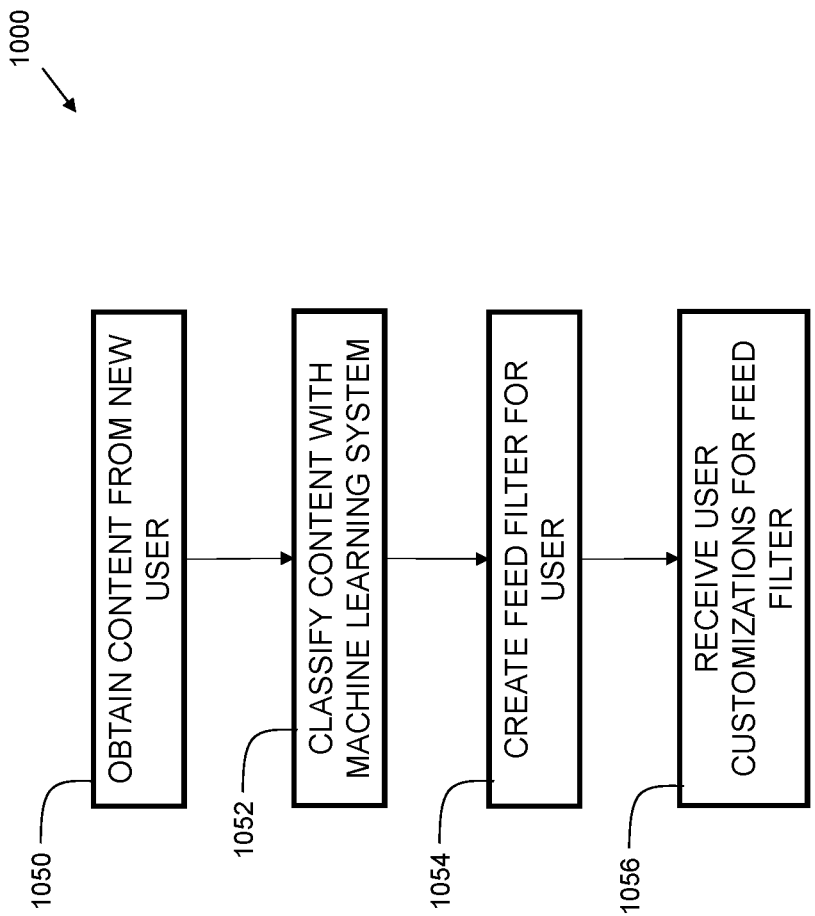
FIG. 11 is a flowchart showing a process for new user intake.

FIG. 11 is a flowchart 1000 showing a process for new user intake. At 1050, content is obtained from a new user. The content can be initial content that the user plans to post to social media system 156. Alternatively, the content can be content the user has previously posted to other social media sites. At 1052, the content is classified with a machine learning system (e.g., 152 of FIG. 2). AT 1054, a feed filter is created for the user. The feed filter can include descriptor tags pertaining to content the user wants allowed or blocked from his/her customized content feed. At 1056, customizations for the feed filter are received. This feature allows the user to edit the original feed filter that was created by machine learning system 152. This allows the feed filter to be corrected as needed, and also allows the feed filter to change as a user's preferences evolve over time.

Figure 12:
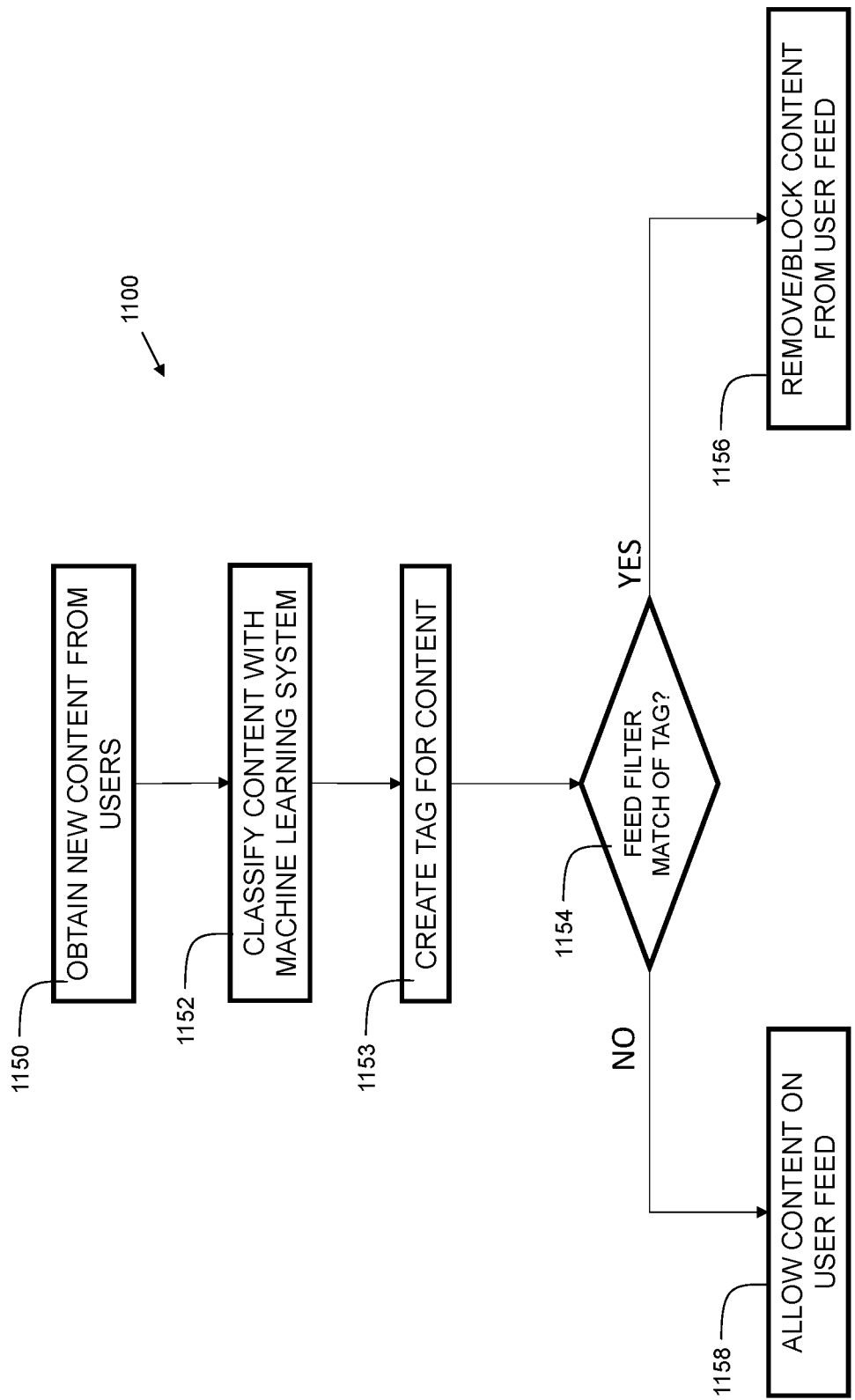
FIG. 12 is a flowchart showing a process for computerized moderation of a social media network in accordance with disclosed embodiments.

FIG. 12 is a flowchart 1100 showing a process for computerized moderation of a social media network in accordance with disclosed embodiments. At 1150, new content is obtained from various users of the social media system 156. At 1152, content is classified with the machine learning system (e.g., 152 of FIG. 2) and tags are created at 1153. At 1154, a check is made to see if the tags match the feed filter of a given user. This feed filter was previously created/edited in the process shown in FIG. 11. If no at 1154, then the process continues to 1158 where the content is allowed on the user feed. If yes at 1154, then the process continues to 1156 where the content is blocked from the user feed. In some embodiments, content may be added to each user's feeds immediately, and then subsequently removed if the machine learning system 152 determines a classification that causes the tags to match the feed filter.

FIG. 13 shows an exemplary authenticity certificate 1200 in accordance with some embodiments. In this embodiment, the authenticity certificate 1200 contains multiple records, indicated as rows 1222-1226. Authenticity certificate 1200 also contains multiple columns, indicated as 1212-1217. Each column represents a field of a record. Column 1212 represents date. Column 1213 represents a public key. Column 1214 represents an encrypted nonce that is encrypted with the public key. Column 1215 represents additional metadata. The additional metadata can include information regarding the content. In some embodiments, the metadata may include the author identifier in an encrypted form. The column 1216 represents a record number. The column 1217 represents a last field which is a Boolean field containing a true value if the row is the last row in the authenticity certificate. This paradigm enables updatable content authorship changes for original content, as well as revisions to existing content. In some embodiments, the authenticity certificate is unlocked in order to allow an authorship change from anonymous to non-anonymous. In embodiments, the authenticity certificate is unlocked by sending the authenticity certificate, along with the private key of the user attempting to claim the content as his/her own, to the trusted key server 158. The trusted key server decrypts the encrypted nonce using the supplied private key from the user to create a decrypted nonce. A copy of the decrypted nonce is stored on the trusted key server 158 in a secure area of memory. If the decrypted nonce matches the stored copy, the authenticity certificate is unlocked, and the social media content management system 102 then creates a new row in the authenticity certificate, and creates a new content record in a new block of the blockchain to record the change in authorship. Thus, in embodiments, an unlock indication is received from the trusted key server 158.

In embodiments, for each new social media post, or update to a previous post, a new private key is generated and sent to the user. A digital wallet, secure database, trusted store, or other suitable mechanism may be used to store and manage the keys. This creates a convenient way for users to claim ownership for previously posted content. In some embodiments, a new version of a social media post may be created to reflect the claimed ownership. The new version of the social media post is created as a new block on the blockchain, as the original data relating to the social media post cannot be changed due to the immutable nature of the blockchain. Thus, once a social media post is uploaded, that version of the social media post cannot be changed. In some embodiments, subsequent versions of a social media post may be created to reflect content changes and/or claiming of ownership. Each subsequent version of a social media post corresponds to a unique block on the blockchain. In this way, the disclosed embodiments allow claiming of previously anonymous content which has implications for artists, whistleblowers, authors, and others, providing new economic opportunities, encouraging innovation and creativity, and increasing public safety.

Figure 14:
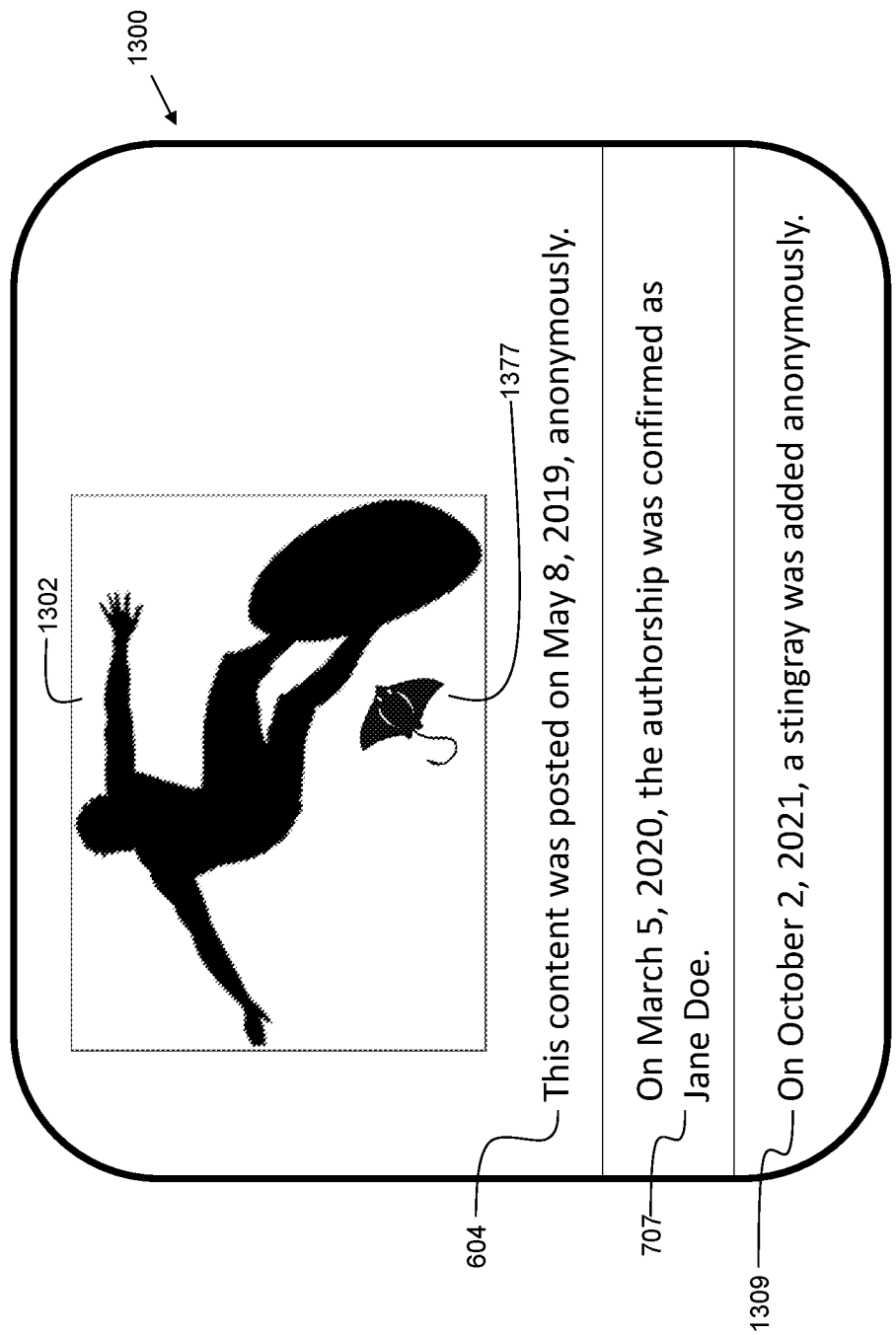
FIG. 14 shows an example of anonymously-authored content on a social media system.
Figure 15:
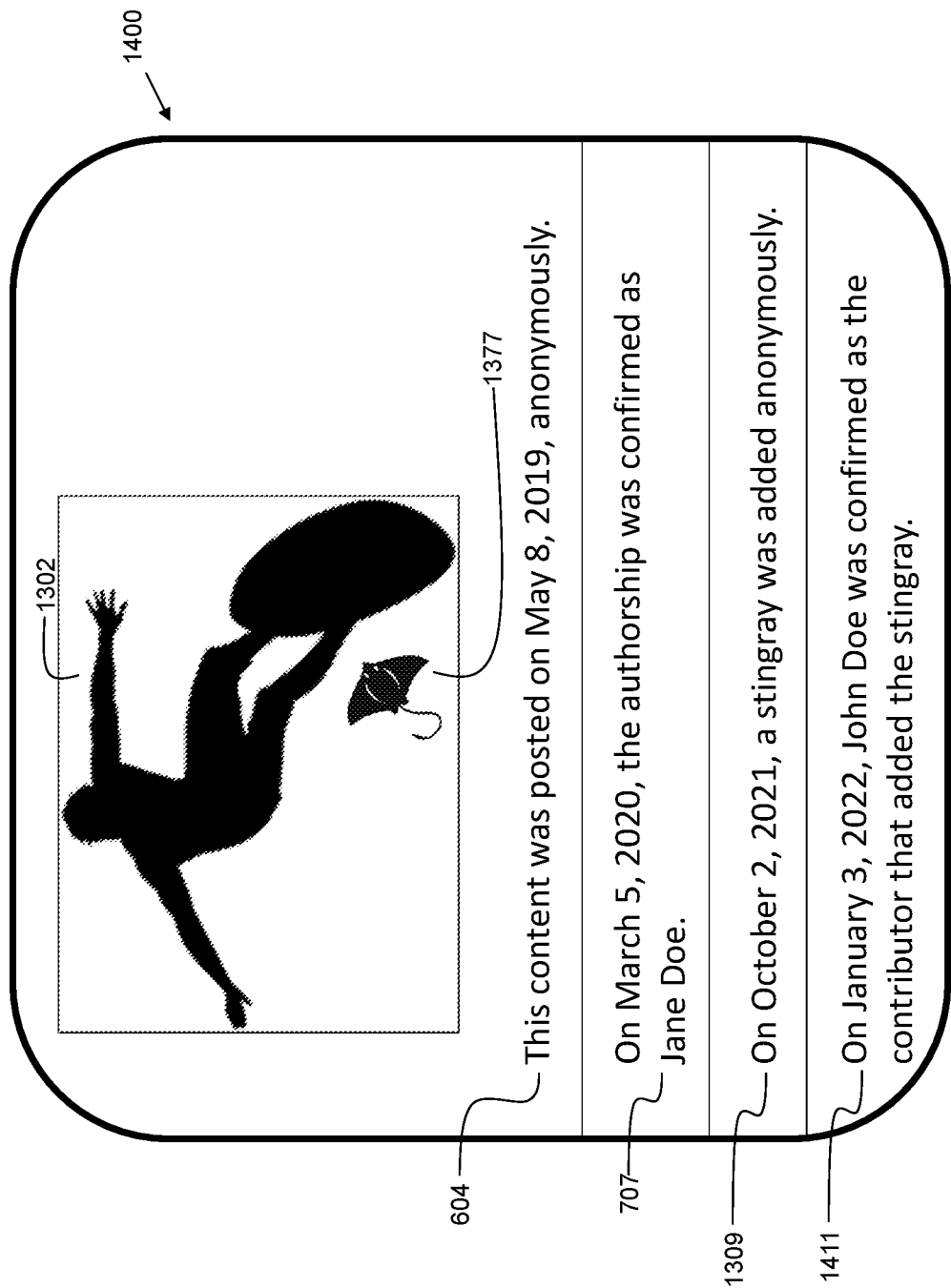
FIG. 15 shows an example of author-identified content on a social media system.

FIG. 14 and FIG. 15 show examples of anonymous to identified content transitions for revisions of content on a social media system. Referring now to FIG. 14, there is shown an image 1302 which is based on image 602 shown in FIG. 8. In this example, a user used a previously posted image 602, and edited the image to add stingray 1377. In embodiments, machine learning system 152 may be used to identify and classify the changes to create the new image 1302 as compared with original image 602. The electronic display 1300 further shows the anonymous creation of the modified image at 1309. Referring now to FIG. 15, at some later time, the user that posted the modified image including stingray 1377 decides to now show proof of authorship for this modification. The user performs a process similar as to outlined in FIG. 10 and using a user interface similar to as shown in FIG. 6. As a result, the electronic display 1400 further shows new authorship identification at 1411, indicating that on Jan. 3, 2022, John Doe added the stingray 1377 to the image that was created by Jane Doe.

Figure 16:
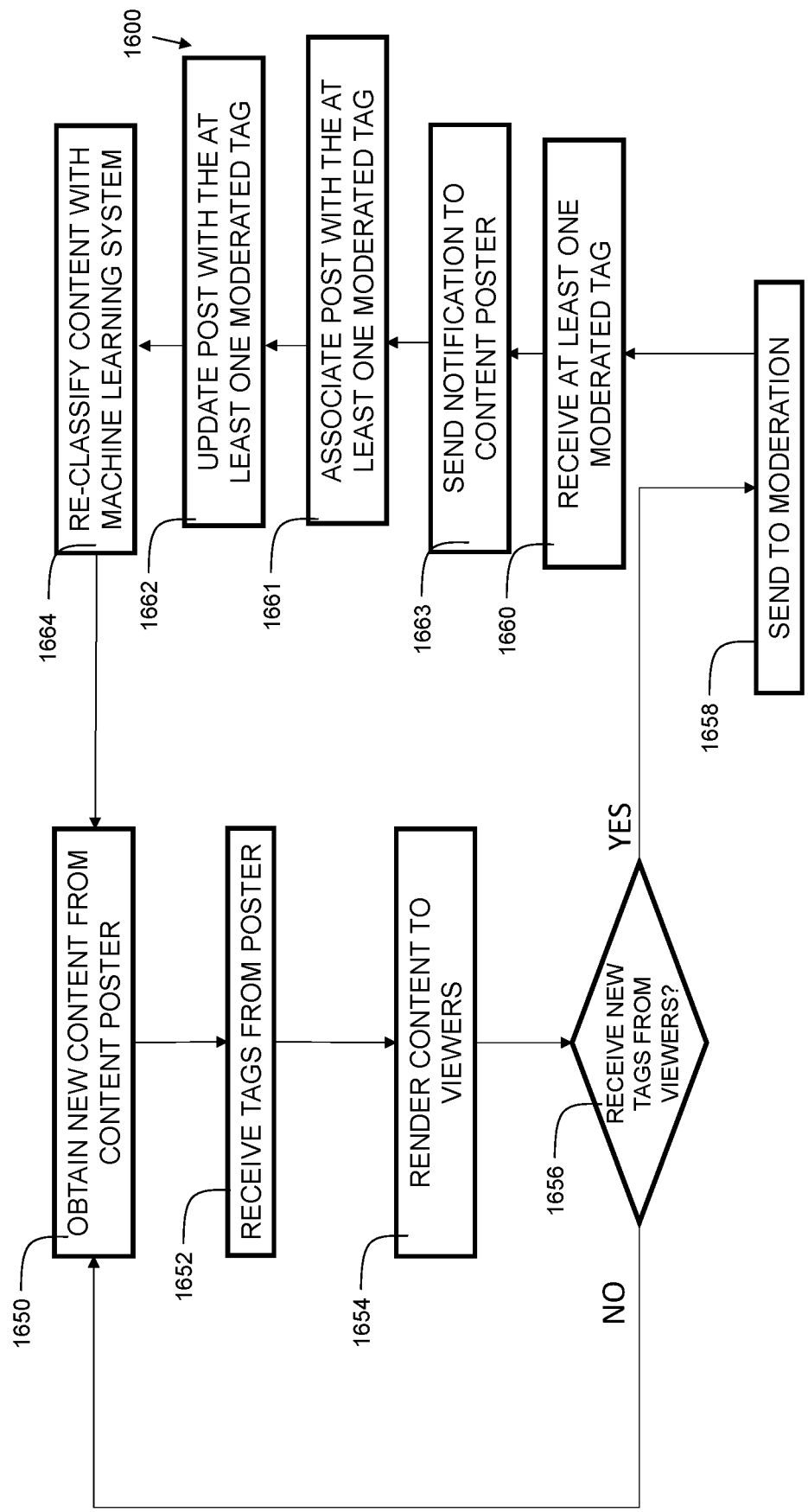
FIG. 16 is a flowchart showing a process for enhanced machine learning training in accordance with disclosed embodiments.

FIG. 16 is a flowchart 1600 showing a process for enhanced machine learning training in accordance with disclosed embodiments. At 1650, new content is obtained from a content poster. The content can be text, audio, images, video, and/or other content type. At 1652, tags provided by the content poster are received and associated with the posted content. At 1654, the content is rendered for client devices of other viewers within a social media system. At 1656, a check is made to see if any viewer (user who is not the poster) has suggested their own tags for this content. If no at 1656, the process returns to 1650 to receive any additional content the poster may have. If yes at 1656, the content, an identifier of the poster (name, username or ID, or other suitable identifier), and viewer tags are sent to a moderator. In some embodiments, for a viewer to have the privilege of being able to submit tags, they must go through an intake process in order to be approved by a moderator, or via another method.

One reason why viewers may post their own tags for content is a difference of opinion over how the poster has classified the content. At 1660, the system receives at least one moderated tag. The at least one moderated tag can be tag(s) from the poster, tag(s) from viewers, and/or tag(s) provided by the moderator. At 1661, the post is associated with the at least one moderated tag, e.g., in a database or blockchain structure. At 1662, the post is updated with the at least one moderated tag. The updated post is now viewable/accessible to the poster and viewers to view from their client devices in their feed. At 1664, the content, along with the moderated tag(s) is submitted to the machine learning system (152 of FIG. 2) to train the machine learning system using the content along with the moderated tags. The process then returns to 1650 to receive any additional content the poster may have.

In some embodiments, at 1663, a notification is sent to the account of the poster, indicating the tagging revisions, and providing a field or other mechanism for the poster to input an explanation or challenge/remove/add to the moderator's tags. The notification can be a private message in the social media system (156 of FIG. 2), or another suitable message. In such embodiments, the moderator can then review the further input from the poster before finalizing the update. In some embodiments, 1663 occurs as shown after 1660, but in some embodiments, can be after 1661 or 1662, or 1664, depending on timing of receipt of the input. In some embodiments, 1663 is not present.

Figure 17B:
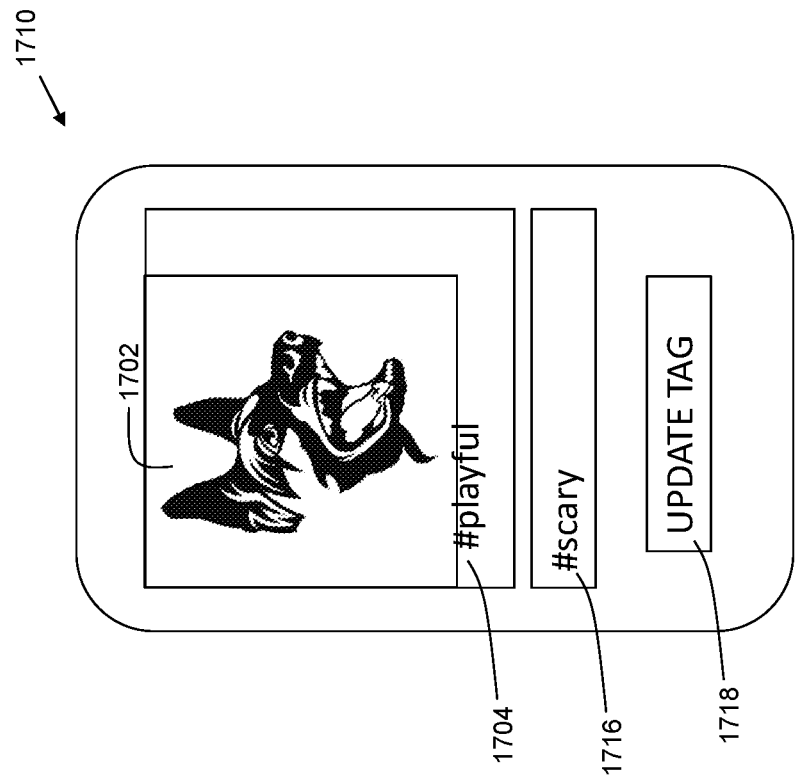
FIG. 17B shows an exemplary user interface for a viewer.
Figure 17A:
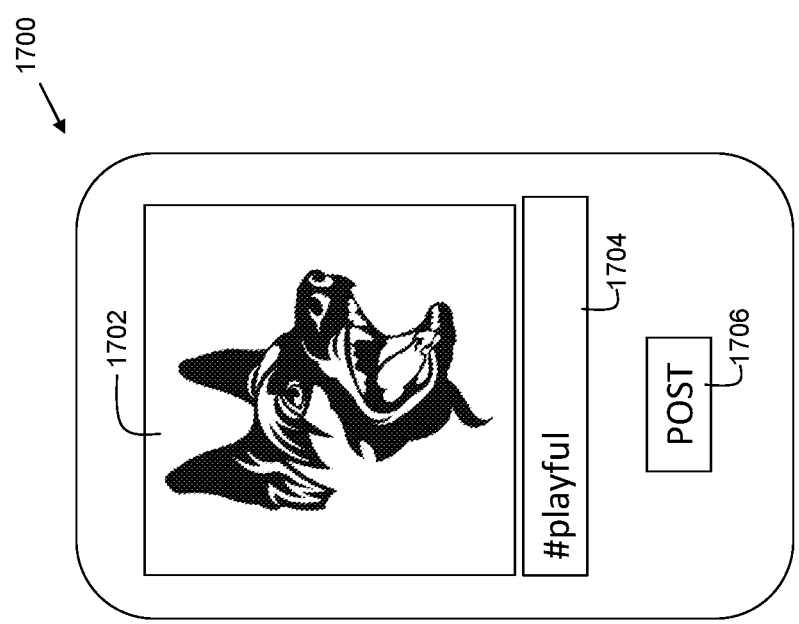
FIG. 17A shows an exemplary user interface for posting content to a social media system.

FIGS. 17A-17D show example user interfaces for process for enhanced machine learning training in accordance with embodiments of the invention. FIG. 17A shows an exemplary user interface 1700 for posting content to a social media system (156 of FIG. 2). The user interface 1700 may be rendered on a client device such as 126 of FIG. 2. At 1702, the digital content that is to be posted to the social media system (156 of FIG. 2) is shown. In this example, the social media content is a digital image 1702 showing a dog. At 1704, there is provided a field for the poster of the content to add a tag. In this example, the user has added the tag #playful. At 1706, there is a post button. When invoked, the post button causes the client device to upload the digital content 1702 along with the tag 1704 to the social media system (156 of FIG. 2).

FIG. 17B shows an exemplary user interface 1710 for a viewer. A viewer, for purposes here, is a user of the social media system (156 of FIG. 2) that is not the poster for the content shown at 1702. The poster-supplied tag for the content is shown at 1704. The user interface includes a field 1716 for the viewer to add his/her own tags. In this example, the viewer-added tag is #scary. At 1718, there is an update tag button. When invoked, the update tag button causes the client device to send the content 1702, the poster-supplied tag 1704, and the viewer-supplied tag 1716 to a moderation portal of the social media system (156 of FIG. 2) where a human moderator can review and/or edit the tags. The moderation portal may be an HTML-based web user interface (or other suitable interface) hosted by social media content management system 102 (or other suitable location).

Embodiments can include obtaining content for posting; receiving a poster-supplied content tag for the obtained content; rendering the content for a client device associated with a viewer; receiving a viewer-supplied content tag for the obtained content; rendering the content, poster-supplied tag, and viewer-supplied tag for a moderation portal; receiving a moderated tag for the obtained content; and associating the moderated tag with the obtained content, for example, in a database. The obtained content combined with the moderated tag can be rendered for the client device associated with the viewer, another viewer, or the poster, when one of such attempts to access it, or it is on their feed, etc. In other words, embodiments can include obtaining content for posting; receiving a poster-supplied content tag for the obtained content; communicating the content for display on a client device associated with a viewer; receiving a viewer-supplied content tag for the obtained content; communicating the content, poster-supplied tag, and viewer-supplied tag to a moderation portal; receiving a moderated tag for the obtained content; and associating the moderated tag with the obtained content, for example, in a database. The obtained content combined with the moderated tag may be communicated to the client device associated with the viewer, another viewer, or the poster, when one of such attempts to access it, or it is on their feed, etc.

Figure 17D:
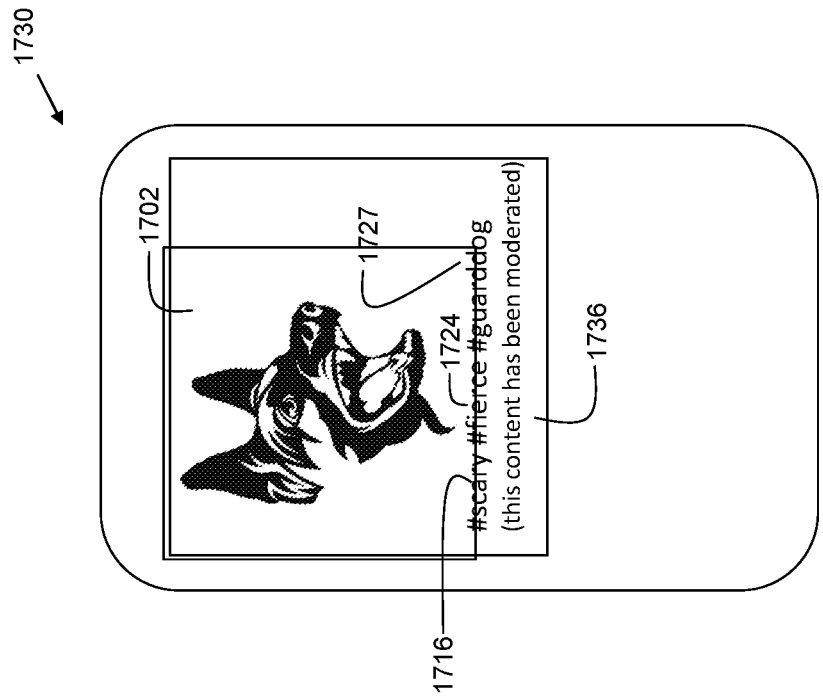
FIG. 17D shows an exemplary user interface for moderated content presented to a viewer.
Figure 17C:
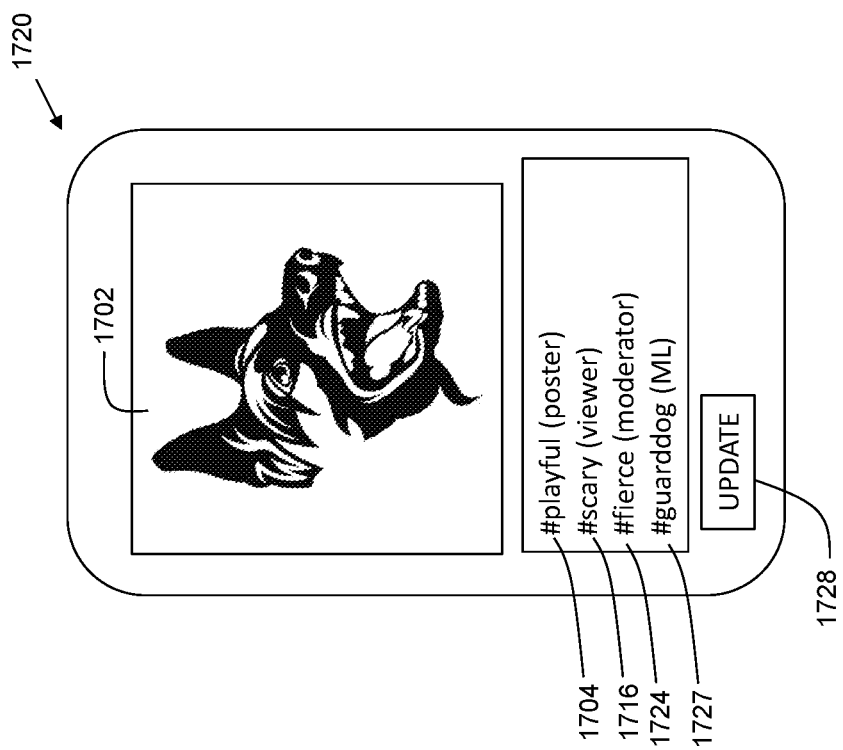
FIG. 17C shows an exemplary user interface for a moderator portal.

FIG. 17C shows an exemplary user interface 1720 for a moderator portal. A moderator is a human curator of content for the social media system (156 of FIG. 2). The user interface 1720 includes the digital content at 1702. The user interface 1720 further includes an indication of poster-supplied tags at 1704. The user interface 1720 further includes an indication of viewer-supplied tags at 1716. The user interface 1720 further includes an indication of moderator-supplied tags at 1724. The moderator has the ability to accept (approve), edit, and/or delete poster-supplied and/or viewer-supplied tags, as well as add his/her/their own moderator-supplied tags. In this example, the moderator-supplied tag is #fierce. Note that while one poster-supplied tag, one viewer-supplied tag, and one moderator-supplied tag are shown in this example, embodiments may provide for multiple poster-supplied tags, viewer-supplied tags and/or multiple moderator-supplied tags. At 1728, there is an update button. When invoked, the update button causes the tags of the digital content 1702 to be updated in the social media system (156 of FIG. 2). When invoked, the update button also causes the digital content 1702, along with updated tags, to be sent to the machine learning system (152 of FIG. 2) for training and retraining based on the moderator-supplied tags. Note that in some embodiments, the sending to the machine learning system is automatic in response to update of the tags. Also shown, there is addition of a tag added by the machine learning system at 1727.

As described herein, tags are crowdsourced from a poster, viewers, a moderator, and a machine learning system. Accordingly, in embodiments, humans and machines work together to tag and make updates to the tags, thereby improving the machine learning model and enabling a human to fill in the gaps, so to speak, on topics a machine does not necessarily understand (such as complex issues of body imagery, race, sexuality, hate speech, etc.). This is in an effort to reduce algorithmic bias.

FIG. 17D shows an exemplary user interface 1730 for moderated content presented to a viewer. User interface 1730 includes the digital content at 1702 which is combined with tags 1716 and 1724 which have been allowed and/or provided by the moderator. The user interface 1730 further includes viewer-supplied tags at 1716. The user interface 1730 further includes moderator-supplied tags at 1724. As can be seen in this example, the moderator deleted the poster-supplied tag 1704 prior to updating the post. The user interface 1730 may also include an indication (i.e. notification) 1736 that the digital content 1702 has been moderated.

As can be seen in this example, a first user posted content of a dog and tagged it as #playful. Other members of the social media system (156 of FIG. 2) disagreed with the characterization of the poster-supplied tag, and proposed the tag of #scary as being more indicative of the content 1702. The moderator reviewed the poster-supplied tag and the viewer-supplied tag, and agreed that the content 1702 was more appropriately tagged as #scary, and also added a moderator-supplied tag of #fierce. In this way, content is distributed in an honest manner that reduces trolling, while still allowing for expression and sharing of content.

Figure 18:
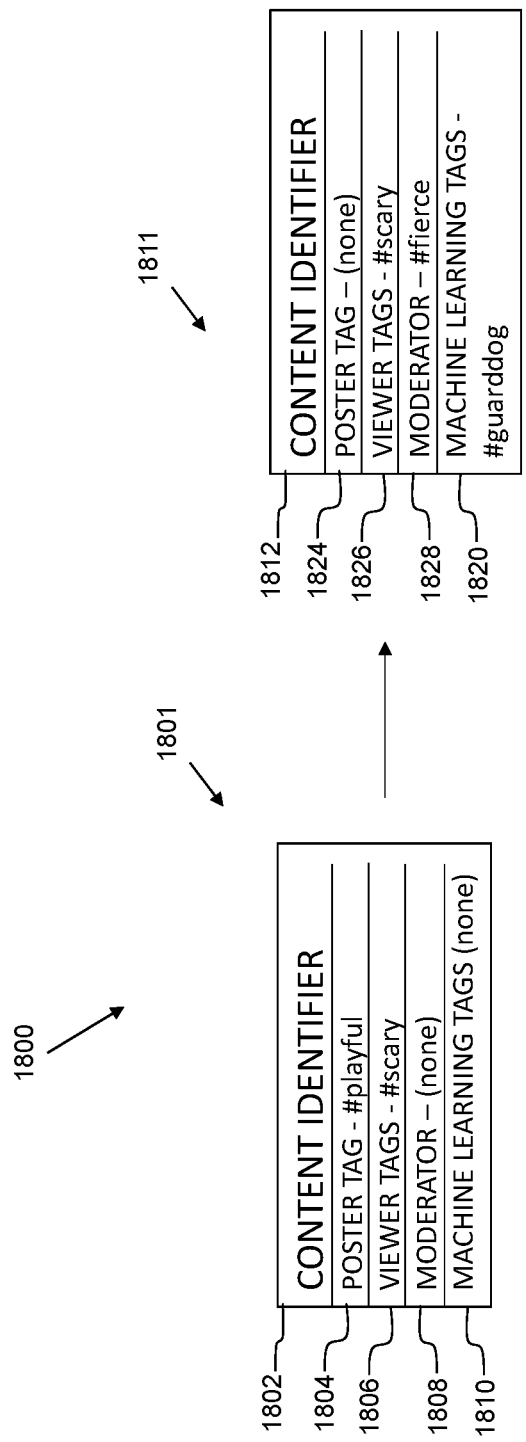
FIG. 18 shows an example database structure.

FIG. 18 shows example database structures 1800 for the example process shown in FIGS. 17A-17D. Field 1801 includes a content identifier at 1802 for the content. Some embodiments include obtaining content for posting; receiving a poster-supplied content tag for the obtained content; associating the poster-supplied content tag with the obtained content in the database structure at 1804; rendering the content for a client device associated with a viewer; receiving a viewer-supplied content tag for the obtained content; associating the viewer-supplied content tag with the obtained content in the database structure at 1806; rendering the content, poster-supplied tag, and viewer-supplied tag for a moderation portal; receiving an update to the tags, wherein the update includes removal of the poster-supplied tag, removal of the viewer-supplied tag, or entry of a moderated tag for the obtained content; and associating the moderated tag with the obtained content in the database structure at 1808, if the update includes the entry of the moderated tag. In some embodiments, the machine learning system adds tags, as well. The updated data structure (as updates were saved) is shown at 1811. Content identifier is shown at 1812 with removal of poster tags at 1824, addition of the moderator tag at 1828, and addition of a tag added by machine learning at 1820 (also represented at 1727 of FIG. 17C). Viewer-supplied tag remains unchanged at 1826. Note that data structures 1800 and 1811 are examples, and another suitable one may be used in accordance with embodiments. In some embodiments, the data in the data structures may be stored in a database as represented in FIG. 18, or in some embodiments, the data may be incorporated into entries on the blockchain similar to as shown in FIG. 3.

Figure 19:
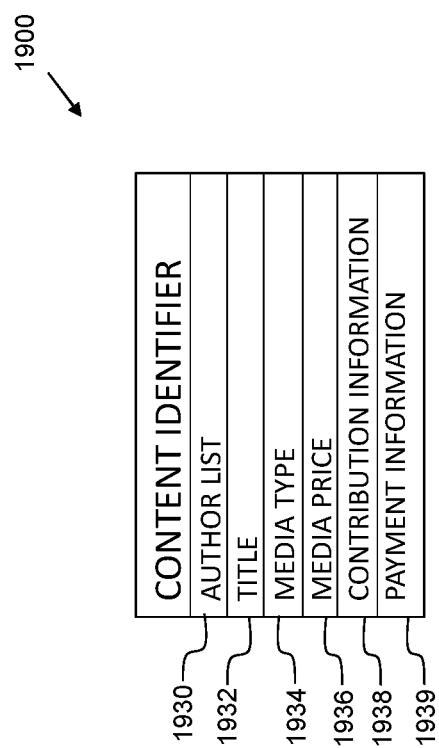
FIG. 19 shows an example content identifier data structure in accordance with embodiments of the present invention.

FIG. 19 an example content identifier data structure 1900 in accordance with embodiments of the present invention. The content identifier data structure 1900 may be similar to that shown at 338 in FIG. 4. Data structure 1800 contains an author list field 1930. Author list field 1830 can contain a list of the author(s) of the content. Data structure 1900 contains a title field 1932. Title field 1932 can contain a title of the content. Data structure 1800 contains a media type field 1934. Media type field 1934 can contain a media type for the content. The media type field can indicate the type of media (content type, e.g., image, text, audio, video), as well as additional formatting and/or container details. In embodiments, the media type field 1934 includes a MIME type. Data structure 1900 contains a media price field 1936. The media price field 1936 can include a price for purchase and/or rental of the content. The media price field 1936 may include prices in multiple currencies such as USD, Euro, etc. The media price field 1936 may also include prices in virtual currencies, cryptocurrencies (such as BTC), "points," and/or other suitable pricing structures. Data structure 1900 contains a contribution information field 1938. Contribution information field 1938 can include a contribution percentage for each author specified in author list field 1930. Data structure 1900 contains a payment information field 1939. Payment information field 1939 contains payment information for each author specified in the author list field 1930. The payment information can include bank routing and account numbers, and/or alternative payment information such as from an online payment processor such as PayPal, Venmo, or the like. Payment information can also include information for receiving cryptocurrency payments, such as a digital wallet address. Note that this is an example data structure, and another suitable structure may be substituted where feasible.

Figure 20:
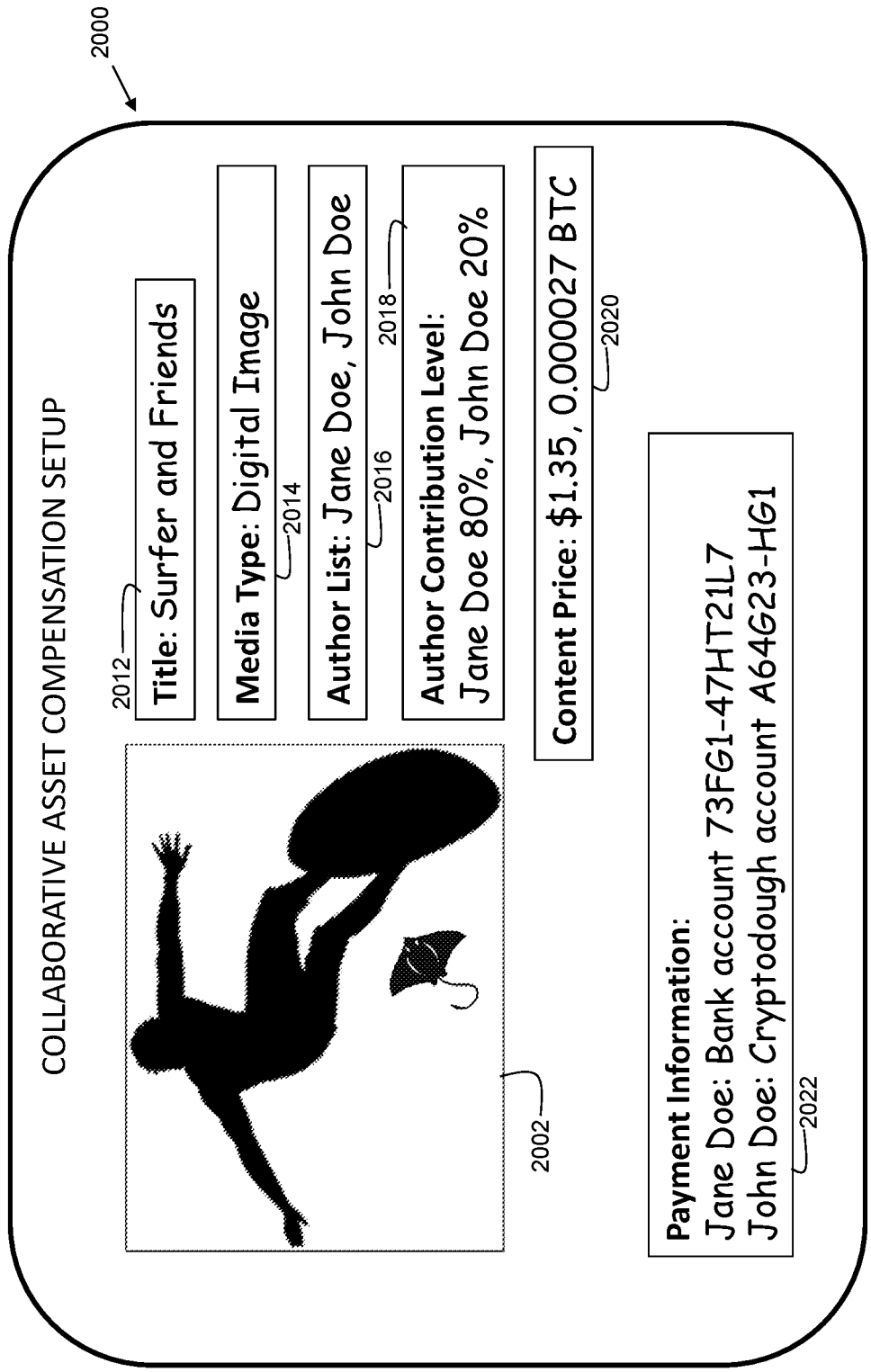
FIG. 20 is an exemplary user interface for collaborative asset compensation setup in accordance with embodiments of the present invention.

FIG. 20 is an exemplary user interface for collaborative asset compensation setup in accordance with embodiments of the present invention. An electronic display 2000 shows a rendering representative of digital content to be offered for sale/rent at 2002. The rendering can be a thumbnail image representing video, audio, text, image, or other type of content. Field 2012 shows the title for the content. Field 2014 shows a media type for the content. Field 2016 shows an authorship list for the content. In this example, there are two authors shown. In practice, there can be one or more authors. In some embodiments, the authorship may remain anonymous, or partly anonymous, where one or more authors are named, and one or more authors are anonymous for the same content. The names displayed in field 2016 can be real names, pen names, screen names, or other monikers, allowing a mix of anonymous and non-anonymous authorship to be displayed for a given piece of content. Thus, in embodiments, the authorship list for the content item comprises a mix of anonymous authors and non-anonymous authors. Field 2018 shows an author contribution level for each author. In this example, the first author has an 80% contribution level (Jane Doe), and the second author has a 20% contribution level (John Doe). As can be seen this example, in some use cases, the contribution level may be unequal, where different contributors receive different payment levels based upon their contribution and/or other arrangements made by the collaborators. In embodiments, each contributor submits a digitally signed document to authenticate the contribution levels that are agreed upon by the authors. Field 2020 shows a price for the content. In some embodiments, the field 2020 can include multiple prices, such as for purchase or rental, or for different formats (e.g., high definition vs. standard definition). Field 2022 shows payment information for each author. Each author can have individual payment information such that each can be paid as he/she prefers. The payment information can include bank accounts, preferred payment processor, online payment processing information, and/or cryptocurrency/digital wallet address information.

Thus, some embodiments can include receiving an authorship list for a content item, wherein the authorship list includes a plurality of authors for the content item; receiving a contribution level for each author of the plurality of authors; receiving payment information for each author of the plurality of authors; and sending funds to each author of the plurality of authors, using the payment information, in response to determining a royalty earned from the content item. The royalty can be from sale and/or rent of the content item. In embodiments, the sale or rental may be executed through a social media content management system (system 102 of FIG. 2).

Some embodiments can include receiving an authorship list for a content item, wherein the authorship list includes a plurality of authors for the content item; receiving a contribution level for each author of the plurality of authors; receiving payment information for each author of the plurality of authors; and sending a notification (to a payment processor, or similar outlet) indicating an amount of funds to be sent each author of the plurality of authors, using the payment information, in response to determining a royalty earned from the content item. The royalty can be from sale and/or rent of the content item. When a payment processor is used, certain payment information may be provided to the payment processor only, and not embodiments.

Disclosed embodiments enable content creators to sell/rent content with various levels of payment based on collaboration. In the example shown in FIG. 19, a first artist contributed 80% to the content, while a second artist contributed 20% to the content. Thus, if the total royalties due the authors for sale/rental of the content is $100, then the first author (Jane Doe) receives $80 while the second author (John Doe) receives $20. Additionally, one or more authors may be anonymous, while one or more other collaborating authors for the same content may be non-anonymous. In embodiments, an anonymous author may utilize an anonymous payment method such as cryptocurrency, or a semi-anonymous payment method such as Venmo, PayPal, or the like. In this way, a wide variety of collaboration and payment distribution techniques are possible, allowing content creators to effectively and fairly distribute collaborative works.

Figure 21:
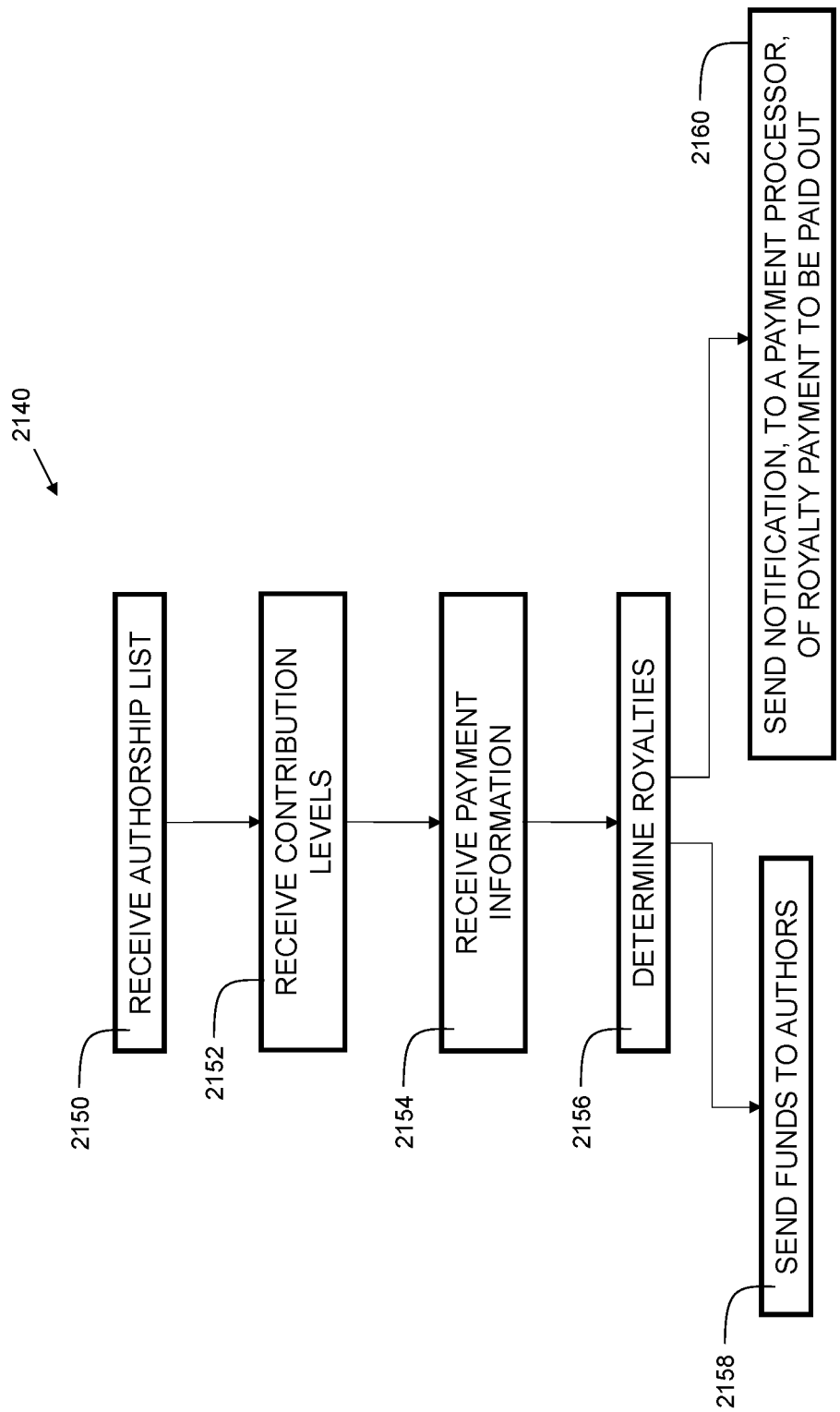
FIG. 21 is a flowchart showing a process for collaborative asset compensation in accordance with disclosed embodiments.

FIG. 21 is a flowchart 1040 showing a process for collaborative asset compensation in accordance with disclosed embodiments. At 2150, an authorship list is received. The authorship list can include multiple authors that contributed to a piece of content such as a video, song, written composition, image, or other content type. At 2152, contribution levels are received for each author (from one or more of the authors, or in another suitable manner). The contribution levels can be equal for each of multiple authors, or the contribution levels can differ amongst the authors. At 2154, payment information is received for each author. The payment information can include bank routing and account numbers, cryptocurrency payment information, digital wallet information, and/or other suitable payment information. Each author can have his/her own payment information. At 2156, royalty payments are determined. The royalty payments can be for sale and/or rental of content. The content can be digital assets, for example, NFTs, files, or other digital items stored within, and/or hosted by, and/or accessed through the social media system 156. The content may be stored as an NFT in a blockchain such as, for example, as indicated at 212 of FIG. 3. The digital assets can include songs, poems, videos, movies, audiobooks, comedy routines, illustrations, photographs, documentaries, and/or other suitable content. The royalty payments may differ for authors of a given piece of content based on collaboration level and/or other arrangement made by the authors. In some embodiments, where embodiments are configured to make payments, at 2158, the funds are sent to authors to disseminate the royalty payments. Instead, in some embodiments, where embodiments are in communication with a payment processor, at 2160, a notification is sent to a payment processor (of fiat currency, digital currency, etc.) to disseminate royalty payments in the determined amounts. Accordingly, in some embodiments, step 2158 or step 2162 may not be present. In some embodiments, they may both be present if one author elects to be paid by embodiments, and another elects to be paid via a separate payment processor.

Note that user interfaces herein are examples, and other suitable interfaces may be substituted where feasible. In addition, when described herein as a button, pull-down menu, checkbox, radio button, or similar item, it is not meant to be limiting. Any suitable mechanism for achieving the result is included within the scope of the invention. For example, instead of a button, a pull-down menu may be substituted.

Note that the described components of authorship conversion, feed filter customization, machine learning, and royalty determination/distribution methods and systems may be combined as a single embodiment, or one may be implemented as separate embodiments without one or more of the other components.

Embodiments include a machine learning system that empowers a diverse community of users to train an algorithm to understand the granular distinctions of complex social concepts.

Because while both computers and humans have a hard time defining those differences in concrete terms, people can tell the difference between, say, erotic art versus pornography when it's in front of them. (Famously, in the U.S. Supreme Court case of *Jacobellis* v. *Ohio,* 378 U.S. 184 (1964), in trying to distinguish obscenity from erotica, former Supreme Court Justice Potter Stewart stated in his concurrence, "I know it when I see it."). The use of pre-set tags and user/moderator collaboration to create nuanced data-sets around complex visual and textual data (for example data regarding sexuality, gender, race, etc.).

In embodiments, the algorithm the machine learning model is trained by preset tags—the model is the result of training of images by suggested tags that are sent to a moderator to approve before training/labeling that image. In this way, the users and moderators collaborate to label the data in more nuanced ways than previously achieved. The front-facing aspect of the technology is the pre-set tags chosen by 1) the initial poster of the image or text, then 2) users who encounter that image or text and wish to label it more accurately, and 3) the moderator who ultimately approves tags on the post, with input and consent from the original poster. The moderator interaction with the tags (approve and reject) also becomes part of the training model in that these interactions reinforce labeling patterns. The backend tool we use allows the moderator to approve/add/remove/reject tags on a post, and in this way the model keeps on seeing more examples and learns the moderator's interactions with the user as well as learns the users labeling patterns. In this way, the moderators are doing interactive machine learning on top of the ongoing user-driven training—so, training while also in production.

Embodiments use the power of the collective to create the knowledge base and data set, which the algorithms can then apply in a way that's faster than any one individual could. This requires confidence in your user base, which is why some embodiments implement a gated entry. In some embodiments, anyone can browse the social media system, but to participate in the community, a user must apply by submitting a couple of posts to contribute to the platform as well as information on why they want to join.

In some embodiments, the only users who are able to suggest revisions to post tags are Approved Users, meaning that these users have been pre-qualified through an intake process as understanding of the community guidelines and therefore capable of making nuanced decisions. Feeding their knowledge into the machine learning model teaches it to be more effective and unbiased.

Not all of the preset tags will be used with training the model, as the model develops it will become clear to the moderator and the ML which tags are used to distinguish nuanced images and text, as well as accurately pinpoint and eliminate harmful content In some embodiments, the original poster consent process is as follows: The poster choose tags to label their post. Viewers engage with post and suggest tags that get reviewed by a moderator. The moderator adds or removes tags based on their expertise as well as approves or rejects suggested tags. The original poster is notified of the tagging revisions, and has the ability to request further explanation or challenge/remove/add to the moderator's tags.

The features/patterns/data that the model learns are pointed out by humans (both users and moderators) in detail from the start. Preset tags allow for efficient cooperation between users, moderators, and data scientists so that the machine learning model would be trained to detect specific compositions, objects, language in an image or text that could signal that very likely to signal that a post or comment is harmful where previous algorithms have failed. The model or models can be used in cases such as racism, sexism, homophobia, body positivity, sex education, and more where data trained in traditional models tend to make more mistakes.

Embodiments' ML tagging system is specifically designed to categorize or extract these areas that for so long have been really hard for machine learning models to accurately label because of the lack of effectively organized and moderated community generated feedback. Embodiments specifically looking for these areas that are difficult to label and then we're giving the community terms in which they can then start sorting the data.

The user will not have tagged specific patterns or objects in the image/text, therefore it is the job of the moderator or data scientist to take those suggested tags and apply them to specific aspects of the image/text and specify the occurrence of those categories.

As can now be appreciated, disclosed embodiments improve the technical field of content distribution by enabling an immutable record of ownership/authorship that can be initially shared anonymously, and then authorship can be changed at some future time. In some embodiments, authorship may be changed from one name to another name (e.g., to support name changes for marriage or other reasons). In some embodiments, authorship can only be changed from anonymous to a non-anonymous state, depending on the policy of the social media system 156. Embodiments also provide improved content moderation by the use of training machine learning via moderator-supplied content tags. Embodiments also provide improved collaborative content sale/rental with individualized payment and anonymity settings for each collaborator for digital content.

The features of disclosed embodiments provide an inclusive online environment for social media. Postings are automatically tagged by a machine learning process trained on preset metadata derived from behavioral data provided by users. This is the basis for computer-implemented moderation techniques that are inclusive, rather than exclusive of user preferences. Feed filters for individual users allow content to be removed from those specific users, without removing it for other users. Additionally, content can be posted anonymously, and then at some later time, the authorship of the content can be changed to an identity selected by the originator of the content. There are numerous scenarios where such a feature can be quite useful. One instance includes publication of content that is considered controversial at the time of posting. Then at some future time, when the posting is less controversial, and the originator of the content wishes to unequivocally prove that he/she is the originator, he/she can claim authorship using disclosed embodiments.

Although embodiments of the invention have been described herein as systems and methods, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A computer-implemented method for content management comprising:
    predefining a pre-set of classification tags, for classifying content for uploading to a digital platform according to content category and use case, wherein the pre-set of classification tags is used for training a machine learning system of a content management system;
    classifying content uploaded by an author to the digital platform, based on at least one classification tag identifying objects and descriptors for the content, by:
        providing the content with at least one classification tag by the author,
        adding at least one classification tag, by the machine learning system, to the content, wherein the at least one classification tag is selected from the pre-set of classification tags, based on classification of the content, and wherein the classification tag is a descriptive tag identifying object and descriptors for the content, and
        adding, through a user interface by a content viewer, at least one additional tag, in response to incorrect tagging by the author or the machine learning system, to the content;
    storing the uploaded content with the at least one classification tag assigned by the author, the at least one classification tag assigned by the machine learning system in a database, and at least one additional tag assigned by the content viewer;
    reviewing the classification tag assigned by at least one of the author, the machine learning system, or the content viewer, by a moderator of the digital platform;
    generating, in response to the review, moderated classification tags, through a backend tool, by editing the classification tags associated with the uploaded content by moderator of the digital platform;
    receiving a feed filter, from the content viewer through the user interface, wherein the feed filter contains a list of descriptor tags associated with type of content excluded from streaming for the content viewer;
    blocking the content excluded, based on the feed filter, from streaming, wherein the feed filter is editable by the content viewer;
    training the machine learning system, based on the assigned classification tags and moderated classification tags, to perform content classification; and
    managing an authorship associated with the uploaded content, comprising:
        storing an authorship identification associated with the uploaded content,
        receiving a request to change the authorship identification associated with the uploaded content based on successfully performing a key pair authentication check using a private key provided to the author, and
        updating the authorship identification associated with the uploaded content, from anonymous to non-anonymous.

2. The computer-implemented method of claim 1, wherein performing the key pair authentication check comprises:
    sending an authenticity certificate and a private key to a trusted key server; and
    receiving an unlock indication from the trusted key server.

3. The computer-implemented method of claim 2, wherein the authenticity certificate includes an encrypted nonce.

4. The computer-implemented method of claim 3, wherein the authenticity certificate includes a public key.

5. The computer-implemented method of claim 1, further comprising:
    receiving an authorship list for the uploaded content, wherein the authorship list includes: a plurality of authors for the uploaded content;
    receiving a contribution level for each author of the plurality of authors;
    receiving payment information for each author of the plurality of authors; and
    sending funds to each author of the plurality of authors using the payment information in response to determining a royalty earned from the uploaded content.

6. The computer-implemented method of claim 5, wherein the authorship list for the uploaded content item comprises a mix of anonymous authors and non-anonymous authors.

7. The computer-implemented method of claim 1 further comprising:
   storing the uploaded content with corresponding authorship identification on a blockchain; and
   creating a new version of the uploaded content, upon receiving a request to change the authorship identification, wherein the new version of the uploaded content corresponds to a new block on the blockchain.

8. The computer-implemented method of claim 1, wherein the step of editing the classification tags by the moderators comprises approval, addition, deletion, and edition of the classification tags.

9. An electronic computation device, configured to implement a content management system, comprising: a processor; a memory coupled to the processor, the memory containing instructions, that when executed by the processor, cause the electronic computation device to: classify the content, by:
   predefining a pre-set of classification tags, for classifying content for uploading to a digital platform according to content category and use case, wherein the pre-set of classification tags is used for training a machine learning system of a content management system;
   classifying content uploaded by an author to the digital platform, based on at least one classification tag identifying objects and descriptors for the content, by:
      providing the content with at least one classification tag by the author,
      adding at least one classification tag, by the machine learning system, to the content, wherein the at least one classification tag is selected from the pre-set of classification tags, based on classification of the content, and wherein the classification tag is a descriptive tag identifying object and descriptors for the content, and
      adding, through a user interface by a content viewer, at least one additional tag, in response to incorrect tagging by the author or the machine learning system, to the content;
   storing the uploaded content with the at least one classification tag assigned by the author, the at least one classification tag assigned by the machine learning system in a database, and at least one additional tag assigned by the content viewer;
   reviewing the classification tag assigned by at least one of the author, the machine learning system, or the content viewer, by a moderator of the digital platform;
   generating, in response to the review, moderated classification tags, through a backend tool, by editing the classification tags associated with the uploaded content by moderator of the digital platform;
   receiving a feed filter, from the content viewer through the user interface, wherein the feed filter contains a list of descriptor tags associated with type of content excluded from streaming for the content viewer;
   blocking the content excluded, based on the feed filter, from streaming, wherein the feed filter is editable by the content viewer;
   training the machine learning system, based on the assigned classification tags and moderated classification tags, to perform content classification; and
   managing an authorship associated with the uploaded content, comprising:
      storing an authorship identification associated with the uploaded content,
      receiving a request to change the authorship identification associated with the uploaded content based on successfully performing a key pair authentication check using a private key provided to the author, and
      updating the authorship identification associated with the uploaded content, from anonymous to non-anonymous.

10. The electronic computation device of claim 9, wherein the memory further comprises instructions, that when executed by the processor, cause the electronic computation device to:
   send an authenticity certificate and a private key to a trusted key server; and
   receive an unlock indication from the trusted key server.

11. The electronic computation device of claim 9, wherein the memory further comprises instructions, that when executed by the processor, cause the electronic computation device to:
   receive an authorship list for the uploaded content, wherein the authorship list includes a plurality of authors for the content item;
   receive a contribution level for each author of the plurality of authors;
   receive payment information for each author of the plurality of authors; and
   send funds to each author of the plurality of authors using the payment information in response to determining a royalty earned from the uploaded content.

12. The electronic computation device of claim 11, wherein the memory further comprises instructions, that when executed by the processor, cause the electronic computation device to include a mix of anonymous authors and non-anonymous authors in the authorship list.

13. A computer program product for an electronic computation device, configured for content management, comprising a non-transitory computer readable storage medium having program instructions embodied therewith, the program instructions executable by a processor to cause the electronic computation device to:
   predefining a pre-set of classification tags, for classifying content for uploading to a digital platform according to content category and use case, wherein the pre-set of classification tags is used for training a machine learning system of a content management system;
   classifying content uploaded by an author to the digital platform, based on at least one classification tag identifying objects and descriptors for the content, by:
      providing the content with at least one classification tag by the author,
      adding at least one classification tag, by the machine learning system, to the content, wherein the at least one classification tag is selected from the pre-set of classification tags, based on classification of the content, and wherein the classification tag is a descriptive tag identifying object and descriptors for the content, and
      adding, through a user interface by a content viewer, at least one additional tag, in response to incorrect tagging by the author or the machine learning system, to the content;
   storing the uploaded content with the at least one classification tag assigned by the author, the at least one classification tag assigned by the machine learning system in a database, and at least one additional tag assigned by the content viewer;

reviewing the classification tag assigned by at least one of the author, the machine learning system, or the content viewer, by a moderator of the digital platform;

generating, in response to the review, moderated classification tags, through a backend tool, by editing the classification tags associated with the uploaded content by moderator of the digital platform;

receiving a feed filter, from the content viewer through the user interface, wherein the feed filter contains a list of descriptor tags associated with type of content excluded from streaming for the content viewer;

blocking the content excluded, based on the feed filter, from streaming, wherein the feed filter is editable by the content viewer;

training the machine learning system, based on the assigned classification tags and moderated classification tags, to perform content classification; and managing an authorship associated with the uploaded content, comprising:
- storing an authorship identification associated with the uploaded content,
- receiving a request to change the authorship identification associated with the uploaded content based on successfully performing a key pair authentication check using a private key provided to the author, and
- updating the authorship identification associated with the uploaded content, from anonymous to non-anonymous.

14. The computer program product of claim 13, wherein the computer program product further includes program instructions, that when executed by the processor, cause the electronic computation device to:
- send an authenticity certificate and a private key to a trusted key server; and
- receive an unlock indication from the trusted key server.

15. The computer program product of claim 13, wherein the computer program product further includes program instructions, that when executed by the processor, cause the electronic computation device to:
- receive an authorship list for the uploaded content, wherein the authorship list includes a plurality of authors for the content item;
- receive a contribution level for each author of the plurality of authors;
- receive payment information for each author of the plurality of authors; and
- send funds to each author of the plurality of authors using the payment information in response to determining a royalty earned from the uploaded content.

16. The computer program product of claim 15, wherein the computer program product further includes program instructions, that when executed by the processor, cause the electronic computation device to include a mix of anonymous authors and non-anonymous authors in the authorship list.

* * * * *